United States Patent
Arakawa

(10) Patent No.: US 9,446,466 B2
(45) Date of Patent: Sep. 20, 2016

(54) WIRE ELECTRICAL DISCHARGE MACHINE FOR PERFORMING MACHINING USING LINEAR AND ROTATIONAL OPERATIONS, SPEED AND SECTIONAL TRANSITIONS

(75) Inventor: Yasuo Arakawa, Minamitsuru-gun (JP)

(73) Assignee: FANUC CORPORATION, Yamanashi (JP)

(*) Notice: Subject to any disclaimer, the term of this patent is extended or adjusted under 35 U.S.C. 154(b) by 1013 days.

(21) Appl. No.: 13/611,524

(22) Filed: Sep. 12, 2012

(65) Prior Publication Data
US 2013/0150999 A1    Jun. 13, 2013

(30) Foreign Application Priority Data

Dec. 9, 2011 (JP) ................ 2011-270199

(51) Int. Cl.
| | |
|---|---|
| *B23H 7/06* | (2006.01) |
| *B23H 7/26* | (2006.01) |
| *B23H 7/20* | (2006.01) |
| *G05B 19/416* | (2006.01) |
| *B23H 11/00* | (2006.01) |

(52) U.S. Cl.
CPC ............ *B23H 7/065* (2013.01); *B23H 7/20* (2013.01); *B23H 7/26* (2013.01); *G05B 19/4163* (2013.01); *B23H 11/003* (2013.01); *G05B 2219/43137* (2013.01); *G05B 2219/45043* (2013.01); *G05B 2219/49082* (2013.01)

(58) Field of Classification Search
CPC .......... B23H 7/065; B23H 7/26; B23H 7/20; B23H 11/003; G05B 19/4163; G05B 2219/45043; G05B 2219/43137; G05B 2219/49082
See application file for complete search history.

(56) References Cited

U.S. PATENT DOCUMENTS

| | | | | |
|---|---|---|---|---|
| 3,843,072 | A | * | 10/1974 | Rayfield ................ 242/361 |
| 4,016,395 | A | * | 4/1977 | Rietveld ............... B23H 7/10 |
| | | | | 219/69.12 |
| 4,084,074 | A | * | 4/1978 | Gilleland et al. ...... 219/69.12 |
| 4,298,781 | A | * | 11/1981 | Inoue ..................... 219/69.12 |

(Continued)

FOREIGN PATENT DOCUMENTS

| | | |
|---|---|---|
| EP | 0530790 A2 | 3/1993 |
| EP | 0530790 A3 | 2/1994 |

(Continued)

OTHER PUBLICATIONS

Moulton, D.B., "Wire EDM 'The Fundamentals'", Sugar Grove, IL, EDM Network, 1999.*

(Continued)

*Primary Examiner* — Mohammad Ali
*Assistant Examiner* — Kelvin Booker
(74) *Attorney, Agent, or Firm* — Hauptman Ham, LLP

(57) ABSTRACT

A wire electrical discharge machine is provided with a rotating shaft for rotating a workpiece. In wire electrical discharge machining according to a machining program, a current average rotation radius at a current workpiece machining point is calculated for each predetermined period, based on average rotation radii at respective end points of a block to be executed and a directly preceding block and an amount of movement of the rotating shaft. Based on the calculated current average rotation radius, control is performed such that the speed of movement of the wire electrode relative to the workpiece machining point agrees with a command speed acquired from a machining power supply.

8 Claims, 16 Drawing Sheets

(56) References Cited

U.S. PATENT DOCUMENTS

| | | | | |
|---|---|---|---|---|
| 4,307,279 A | * | 12/1981 | Inoue et al. | 219/69.12 |
| 4,320,280 A | * | 3/1982 | Inoue | 219/69.12 |
| 4,431,894 A | * | 2/1984 | Inoue | 219/69.12 |
| 4,467,166 A | * | 8/1984 | Gamo et al. | 219/69.12 |
| 4,491,284 A | * | 1/1985 | Vazquez et al. | 242/362 |
| 4,510,366 A | * | 4/1985 | Inoue | 219/69.17 |
| 4,581,514 A | * | 4/1986 | Inoue | 219/69.12 |
| 4,607,149 A | * | 8/1986 | Inoue | 219/69.12 |
| 4,608,478 A | * | 8/1986 | Aso et al. | 219/69.12 |
| 4,645,894 A | * | 2/1987 | Bonga | 219/69.12 |
| 4,797,526 A | * | 1/1989 | Inoue | B23H 7/10 219/69.12 |
| 4,803,326 A | * | 2/1989 | Kiyoshi | B23H 7/10 204/206 |
| 4,900,890 A | * | 2/1990 | Masaki et al. | B23H 9/00 219/69.12 |
| 4,929,809 A | * | 5/1990 | Aso et al. | 219/69.12 |
| 4,960,971 A | | 10/1990 | Kawanabe | |
| 4,994,643 A | * | 2/1991 | Truty et al. | 219/69.12 |
| 5,013,881 A | * | 5/1991 | Aso et al. | 219/69.12 |
| 5,019,684 A | * | 5/1991 | Ito | 219/69.12 |
| 5,023,420 A | * | 6/1991 | Aso et al. | 219/69.12 |
| 5,086,203 A | * | 2/1992 | Kobayashi et al. | 219/69.12 |
| 5,094,378 A | * | 3/1992 | Aso et al. | 226/172 |
| 5,237,145 A | * | 8/1993 | Magara et al. | 219/69.12 |
| 5,252,799 A | * | 10/1993 | Arakawa | 219/69.12 |
| 5,281,787 A | * | 1/1994 | Arakawa | 219/69.12 |
| 5,493,502 A | | 2/1996 | Niwa | |
| 5,919,380 A | * | 7/1999 | Magara et al. | B23H 7/065 219/69.16 |
| 6,225,589 B1 | * | 5/2001 | Bartok | B23H 7/265 219/69.15 |
| 6,747,236 B1 | * | 6/2004 | Magara et al. | B23H 7/10 219/69.12 |
| 2002/0125218 A1 | * | 9/2002 | Kita et al. | 219/69.12 |
| 2003/0042228 A1 | * | 3/2003 | Arakawa | 219/69.12 |
| 2003/0080094 A1 | * | 5/2003 | Imai et al. | 219/69.11 |
| 2004/0040936 A1 | * | 3/2004 | Arakawa | 219/69.12 |
| 2004/0084419 A1 | * | 5/2004 | Kato et al. | 219/69.12 |
| 2004/0238417 A1 | * | 12/2004 | Arakawa et al. | 210/85 |
| 2005/0115928 A1 | * | 6/2005 | Arakawa et al. | 219/69.12 |
| 2005/0115929 A1 | * | 6/2005 | Sakurai et al. | 219/69.13 |
| 2005/0161441 A1 | * | 7/2005 | Takayama et al. | 219/69.12 |
| 2005/0265854 A1 | * | 12/2005 | Arakawa et al. | 417/243 |
| 2005/0269296 A1 | * | 12/2005 | Arakawa et al. | 219/69.12 |
| 2006/0219667 A1 | * | 10/2006 | Martin et al. | 219/69.12 |
| 2008/0290071 A1 | * | 11/2008 | Arakawa et al. | 219/69.12 |
| 2009/0133929 A1 | * | 5/2009 | Rodland | E21B 10/60 175/16 |
| 2010/0006082 A1 | * | 1/2010 | Glinski et al. | 125/16.02 |
| 2011/0174634 A1 | * | 7/2011 | Cabrera | B23H 3/04 205/645 |
| 2011/0174783 A1 | * | 7/2011 | Suzuki et al. | 219/69.15 |
| 2012/0312786 A1 | * | 12/2012 | Arakawa et al. | B23H 7/06 219/69.11 |
| 2013/0138241 A1 | * | 5/2013 | Arakawa et al. | 700/162 |
| 2013/0168363 A1 | * | 7/2013 | Arakawa | 219/69.15 |

FOREIGN PATENT DOCUMENTS

| | | |
|---|---|---|
| JP | 56-137919 U | 3/1980 |
| JP | 2-97524 U | 8/1990 |
| JP | 6-262437 A | 9/1994 |
| JP | 7-136853 A | 5/1995 |
| JP | 2000-271819 A | 10/2000 |
| JP | 2002-239845 A | 8/2002 |
| JP | 2004-345045 A | 12/2004 |

OTHER PUBLICATIONS

Office Action corresponding to JP 2011-270199, dated Jan. 15, 2013.

Partial European Search Report dated Jun. 2, 2014, corresponds to European patent application No. 12184180.3.

* cited by examiner

G999 R30. K25. ;
G01 X10. A10. R30. K25. ;
G01 X20. A0. R60. K5. ;
G01 X30. A10. R60. K5. ;

FIG. 15
```
G999 R30.
G01 X10. A10. R30. ;
G01 X20. A0. R35. ;
G01 X30. A10. R35. ;
```
FIG. 16
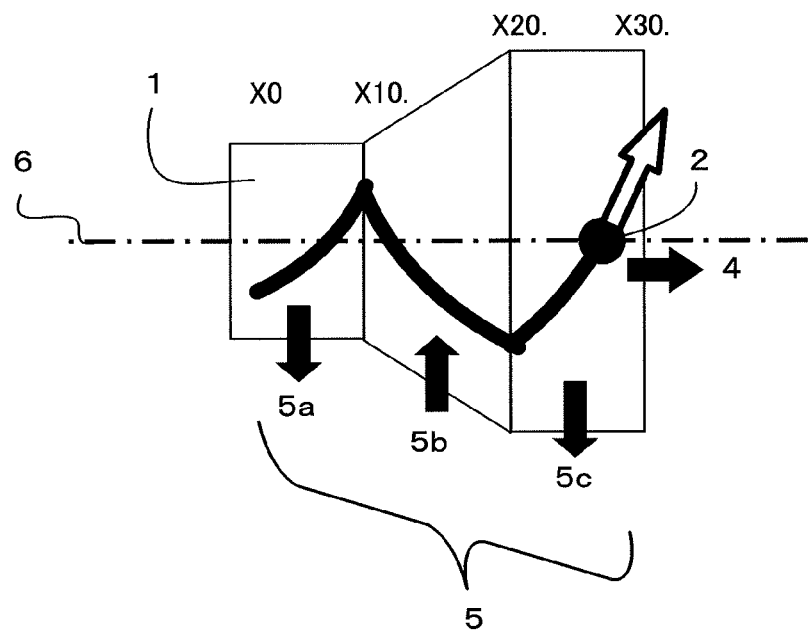
FIG. 17
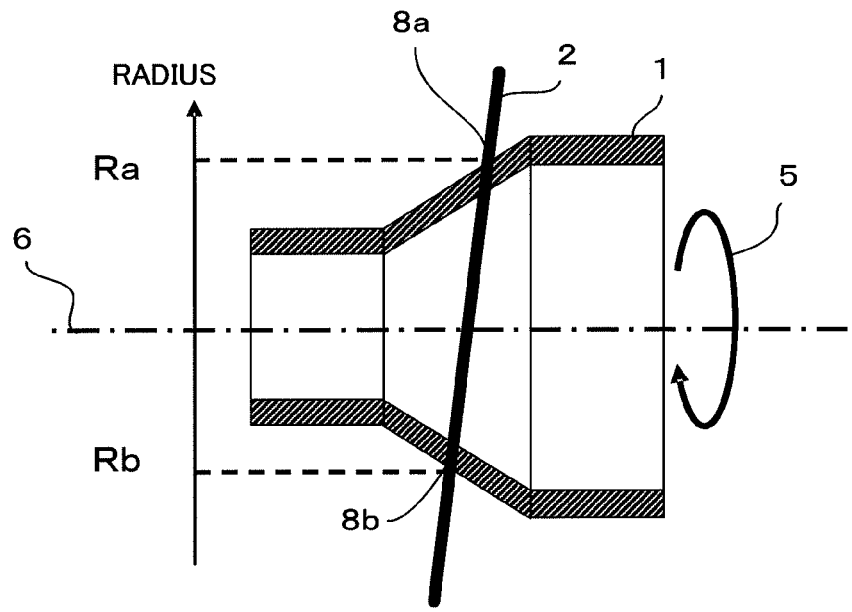

US 9,446,466 B2

WIRE ELECTRICAL DISCHARGE MACHINE FOR PERFORMING MACHINING USING LINEAR AND ROTATIONAL OPERATIONS, SPEED AND SECTIONAL TRANSITIONS

RELATED APPLICATIONS

The present application claims priority from, Japanese Application Number 2011-270199, filed Dec. 9, 2011, the disclosure of which is hereby incorporated by reference herein in its entirety.

BACKGROUND OF THE INVENTION

1. Field of the Invention

The present invention relates to a wire electrical discharge machine provided with a rotating shaft and capable of stably machining a rotating workpiece.

2. Description of the Related Art

Japanese Utility Model Application Laid-Open No. 2-97524 and Japanese Patent Application Laid-Open No. 7-136853 disclose wire electrical discharge machines designed so that a workpiece is rotated as a wire electrode is moved for desired machining, such as machining of a spiral groove in a high-hardness collet-chuck assembly that is used to fix a tool, e.g., a drill. A collet-chuck is a holding device that holds a material by its entire cylindrical inner surface so that the material cannot be easily damaged.

FIG. 19 is a diagram illustrating how a workpiece 1 is rotated as a wire electrode 2 is moved for desired machining by a wire electrical discharge machine. As shown in FIG. 19, desired machining is performed in such a manner that the workpiece 1 is rotated in a workpiece rotation direction 5 about a rotation center axis 6, and at the same time, the wire electrode 2 is moved relative to the workpiece 1 in a wire-electrode movement direction 4. A numerical controller for controlling the wire electrical discharge machine simultaneously issues move commands to a rotation axis about which the workpiece 1 is rotated and a linear axis along which the wire electrode 2 is relatively moved.

While the numerical controller thus simultaneously issues the move commands to the rotation axis for the rotation of the workpiece 1 and the linear axis for the relative movement of the wire electrode 2, control for the speed of movement is conventionally performed in the following manner.

(a) The linear axis (wire electrode) moves at a command speed, and the rotation axis (for workpiece rotation) follows the movement of the wire electrode.

(b) Control is performed such that a synthetic speed of the linear and rotation axes agrees with the command speed, regarding a movement command unit (deg) of the rotation axis as equivalent to that (mm) of the linear axis.

In either of the cases (a) and (b), the speeds of movement of the linear and rotation axes are constant. However, the distance (hereinafter referred to as "rotation radius") between the center of rotation and a position (workpiece machining point) where the workpiece 1 is machined varies with the progress of machining of the workpiece. In some cases, the rotation radius at the workpiece machining point may change for each block of a machining program or gradually vary from the start point of one block toward the end point.

FIG. 20 is a diagram illustrating how the distance from the center of rotation of the workpiece 1 corresponding to the workpiece machining point to the machining point varies as machining of the workpiece progresses. With the progress of the workpiece machining, the distance (rotation radius) from the center of rotation of the workpiece to the workpiece machining point changes from r1 to r2, as shown in FIG. 20. There is a problem that the rotation radius varies between workpiece machining points 7a and 7b and workpiece machining points 8a and 8b for machining by the wire electrode 2, so that the speed of relative movement of the wire electrode 2 and the workpiece 1 changes, thus resulting in a change in the electrical discharge state and unstable machining. As a countermeasure against this, there is a conventional method in which each machining program is divided into very small movement blocks and a command speed is calculated and commanded such that the speed of relative movement of the wire electrode 2 and the workpiece 1 is constant for the blocks. There is a problem, however, that the calculation of the command speed and the creation of machining programs are time-consuming and the machining programs increase.

As shown in FIG. 21, moreover, there may be a problem that the thickness of a workpiece that is hollow inside and varies in inside diameter and wall thickness also changes during machining, thus resulting in a change in the electrical discharge state and unstable machining.

SUMMARY OF THE INVENTION

Accordingly, in consideration of the above problems of the prior art, the object of the present invention is to provide a wire electrical discharge machine capable of achieving control for stable electrical discharge machining in case where the outside diameter of a workpiece varies despite its uniform wall thickness or in case where the workpiece wall thickness varies when the workpiece is rotated for the machining.

A first aspect of a wire electrical discharge machine according to the present invention comprises a machining power supply, at least one linear axis, and a rotation axis extending parallel to the linear axis. In this apparatus, a workpiece is moved relative to a wire electrode, which is stretched under tension between an upper wire guide and a lower wire guide, along the linear axis and is rotated about the rotation axis, according to a machining program, whereby the workpiece is machined. This wire electrical discharge machine further comprises an average rotation radius calculation unit configured to calculate an average rotation radius based on an outer radius and an inner radius of the workpiece designated in each block of the machining program, a current average rotation radius calculation unit configured to calculate a current average rotation radius at a current workpiece machining point for each predetermined period, based on average rotation radii at respective end points of a block to be executed and a directly preceding block, which are calculated by the average rotation radius calculation unit, and an amount of movement of the rotation axis, and a control unit configured to perform control such that the speed of relative movement of the wire electrode and the workpiece machining point agrees with a command speed acquired from the machining power supply, based on the current average rotation radius calculated by the current rotation radius calculation unit.

The average rotation radius may be a value obtained by analyzing the machining program in which outer and inner radii are designated.

The average rotation radius calculation unit may calculate the average rotation radius as a value higher than the sum of the inner radius and half of a value obtained by subtracting the inner radius from the outer radius and lower than the outer radius.

A second aspect of the wire electrical discharge machine according to the present invention comprises a machining power supply, at least one linear axis, and a rotation axis. In this apparatus, a workpiece is moved relative to a wire electrode, which is stretched under tension between an upper wire electrode guide and a lower wire electrode guide, along the linear axis and is rotated about the rotation axis, according to a machining program, whereby the workpiece is machined. This wire electrical discharge machine further comprises a workpiece thickness calculation unit configured to calculate a thickness of the workpiece based on an outer radius and an inner radius of the workpiece designated in each block of the machining program, a current workpiece thickness calculation unit configured to calculate a current workpiece thickness at a current workpiece machining point for each predetermined period, based on thicknesses at respective end points of a block to be executed and a directly preceding block, which are calculated by the workpiece thickness calculation unit, and an amount of movement about the rotation axis, and a control unit configured to perform control such that the speed of relative movement of the wire electrode and the workpiece machining point agrees with a command speed acquired from the machining power supply, based on the current workpiece thickness calculated by the current workpiece thickness calculation unit.

The workpiece thickness calculation unit may calculate the thickness of the workpiece as twice the difference between the outer and inner radii for each block by analyzing the machining program in which outer and inner radii are designated for each block.

The linear axes may be two in number, and the workpiece thickness calculation unit may be configured to calculate the thickness of the workpiece at a position of machining by the wire electrode by the values in the axial coordinate system perpendicular to the center line of the wire electrode position and analysis of the machining program in which the outer and inner radii are designated for each block, in case where the position of machining by the wire electrode is not located near a rotation center axis.

A third aspect of the wire electrical discharge machine according to the present invention comprises a machining power supply, at least one linear axis, and a rotation axis. In this apparatus, a workpiece is moved relative to a wire electrode, which is stretched under tension between an upper wire electrode guide and a lower wire electrode guide, along the linear axis and is rotated about the rotation axis, according to a machining program, whereby the workpiece is machined. This wire electrical discharge machine further comprises a calculation unit configured to calculate a rotation radius at a current workpiece machining point for each predetermined period, based on rotation radii of the workpiece at respective end points of a block to be executed and a directly preceding block and an amount of movement about the rotation axis, and a control unit configured to perform control such that the speed of relative movement of the wire electrode and the workpiece machining point agrees with a command speed acquired from the machining power supply, based on the rotation radius calculated by the calculation unit.

The rotation radius may be a value designated for each block in the machining program and obtained by analyzing the machining program.

According to the present invention, there can be provided a wire electrical discharge machine with a numerical controller, capable of stable machining for a workpiece with a non-constant radius of rotation, especially for a workpiece with non-constant outer and inner radii of rotation, in machining of the workpiece which is rotated about a rotation axis.

BRIEF DESCRIPTION OF THE DRAWINGS

The above and other objects and features of the present invention will be obvious from the ensuing description of embodiments with reference to the accompanying drawings, in which:

FIG. 15 shows an example where a rotation radius at a block end point is commanded according to a machining program;

FIG. 16 illustrates the wire electrical discharge machining of the workpiece according to the machining program of FIG. 15;

FIG. 17 is a diagram illustrating that a rotation radius at an upper workpiece machining point and a rotation radius at a lower workpiece machining point may be different from each other, depending on the direction of inclination of a wire electrode;

DETAILED DESCRIPTION OF THE PREFERRED EMBODIMENTS

Figure 1:
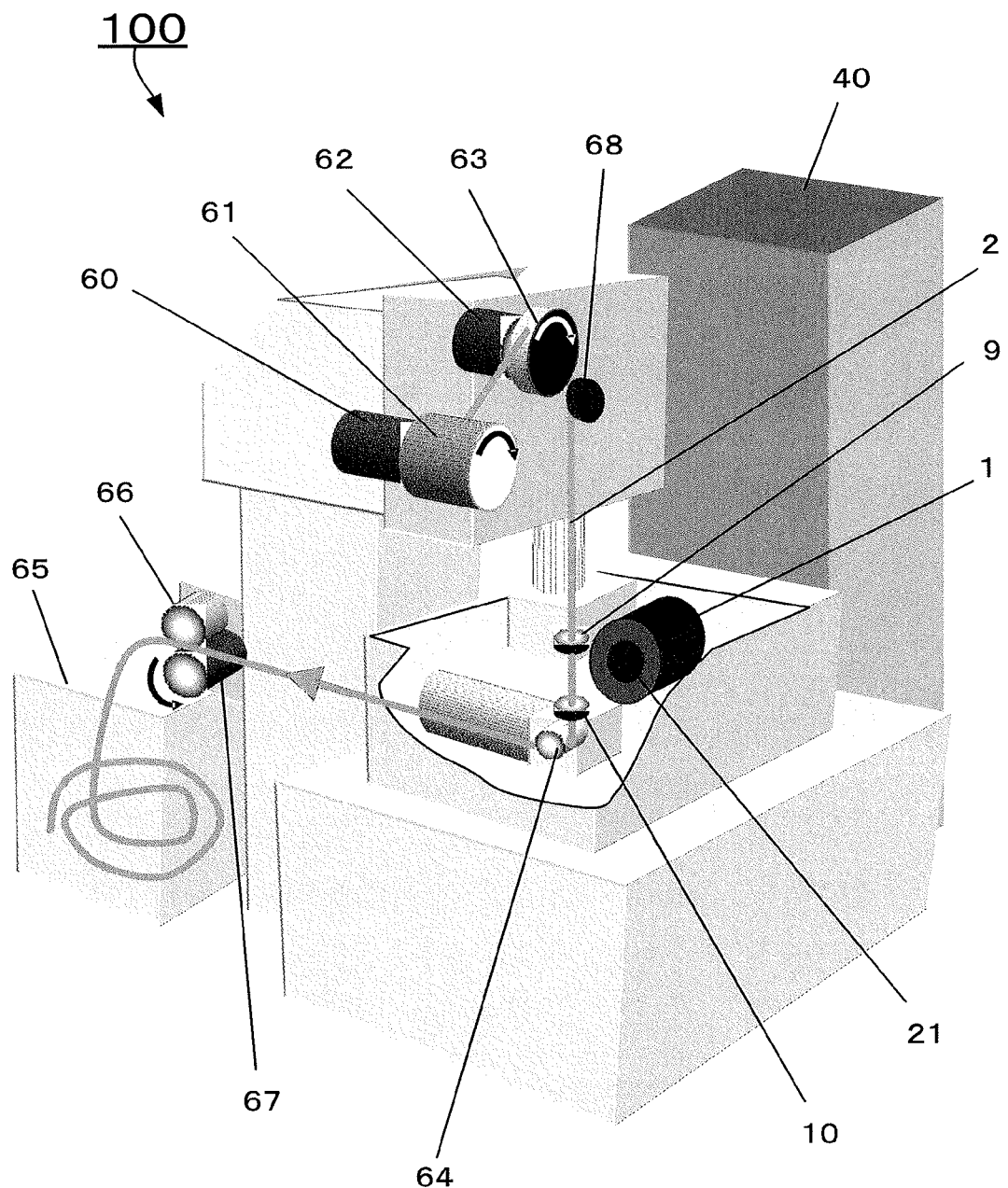
FIG. 1 is a schematic view illustrating a wire electrical discharge machine according to the present invention.
Figure 2:
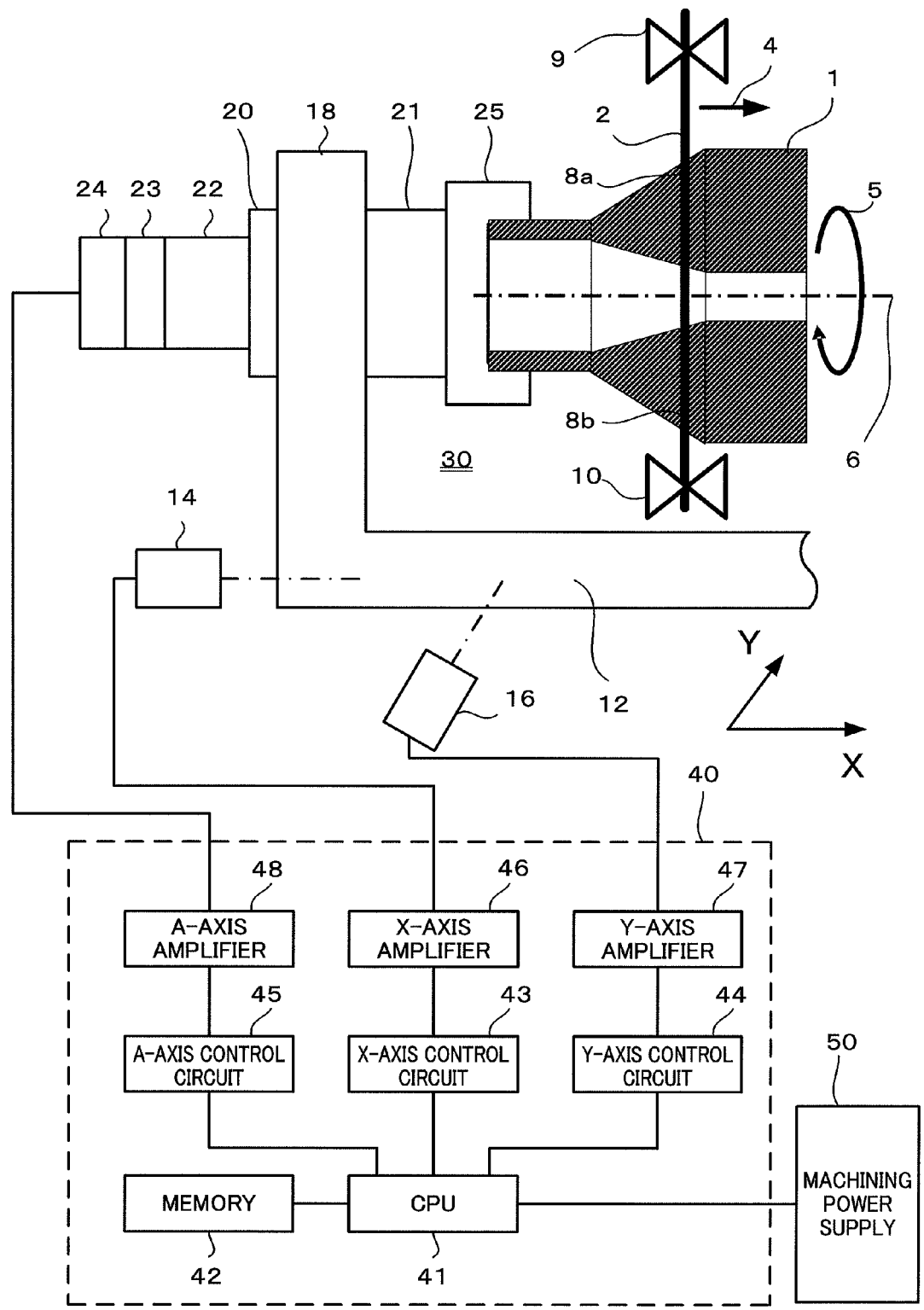
FIG. 2 is a diagram illustrating a configuration of a numerical controller of the wire electrical discharge machine according to the present invention.

Referring to FIGS. 1 and 2, there will be described an outline of a wire electrical discharge machine and a rotating shaft for rotating a workpiece in the discharge machine.

A wire electrical discharge machine 100 comprises a wire electrical discharge machine body and a controller 40 for controlling the machine body. As shown in FIG. 1, a predetermined low torque commanded in a direction opposite to the draw-out direction of a wire electrode 2 is applied to a wire bobbin 61 wound with the wire electrode 2 by a delivery-section torque motor 60. The wire electrode 2 delivered from the wire bobbin 61 passes through a plurality of guide rollers (not shown), and tension is adjusted between a brake shoe 63, which is driven by a brake motor 62, and a feed roller 67, which is driven by a wire electrode feed motor (not shown), by the brake shoe 63. A tension sensor 68 detects the level of tension of the wire electrode 2 that travels between upper and lower wire guides 9 and 10.

As shown in FIG. 2, a rotating shaft 21 is a drive shaft that rotates a workpiece 1, a rotating body, about its center axis. The wire electrode 2 that has cleared the brake shoe 63 passes through the upper and lower wire guides 9 and 10 and a lower guide roller 64, and is inserted between a pinch roller 66 and a feed roller 67, which is driven by the wire electrode feed motor (not shown), and recovered into a wire electrode recovery box 65.

A configuration of the numerical controller of the wire electrical discharge machine will be described with reference to FIG. 2.

A table 12 is movable in two axial directions in a horizontal plane, guided by a guide structure (not shown). The table 12 is moved in the individual directions by an X-axis motor 14 and a Y-axis motor 16. A working tank (not shown) is fixed on the table 12, and it is filled with a working fluid 30. X- and Y-axes are linear axes.

A rotation drive device 20, which provides an A-axis, is secured to a support portion 18 of the table 12, the rotating shaft 21 is rotated by an A-axis motor 22, and an A-axis speed sensor 23 and an A-axis angle sensor 24 are attached to the A-axis motor 22. A workpiece fixture 25 for holding the workpiece 1 is mounted on the distal end of the rotating shaft 21. The workpiece 1 has an axisymmetric shape whose outer diameter and/or inner diameter around the rotation center axis 6 is not constant in the direction of the center axis 6 (that is, the wall thickness of the workpiece varies along the center axis 6).

The wire electrode 2 located opposite the workpiece 1, which is held by the workpiece fixture 25, with a machining gap therebetween, is vertically stretched under a predetermined tension applied by a driving roller and a tension roller (not shown). The wire electrode 2 is guided by the upper and lower dice-shaped wire guides 9 and 10 located up and down. A current feeder (not shown) is disposed in sliding contact with the wire electrode 2, and a pulse voltage is applied from a power supply device (not shown). This pulse voltage produces electrical discharge for machining between the wire electrode 2 and the workpiece 1.

The X- and Y-axis motors 14 and 16, which move the table 12 in the horizontal plane, and the A-axis motor 22, which rotates the workpiece 1, are connected to and drivingly controlled by the numerical controller 40. The A-axis speed sensor 23 and the A-axis angle sensor 24 are also connected to the numerical controller 40 for A-axis control. The numerical controller 40 comprises a CPU 41 as a processor for analyzing a machining program and controlling the entire wire electrical discharge machine, memory 42 for storing various data and the machining program, control circuits 43, 44 and 45 for the axes, and amplifiers 46 and 47 for the respective axes. These constituent elements are conventional ones.

The X- and Y-axis motors 14 and 16 for driving the table 12, axis control circuits 43 and 44 for the X- and Y-axis motors 14 and 16, and amplifiers 46 and 47 constitute planar movement means, which moves the workpiece 1 relative to the tensioned wire electrode 2 in a single plane. Further, the speed sensor 23 for controlling the A-axis motor 22, the A-axis angle sensor 24, the A-axis control circuit 45, and an A-axis amplifier 48 constitute a rotation controller. A machining power supply 50 applies a machining pulse between the workpiece 1 and the wire electrode 2. A circuit from the machining power supply 50 to the workpiece 1 and wire electrode 2 is not shown. The CPU 41, like that of a conventional wire electrical discharge machine, can acquire a command speed Fc from the machining power supply 50.

The workpiece 1 is held by the workpiece fixture 25 of the rotating shaft 21 and immersed in the working fluid 30 in the working tank (not shown) as it is machined. The workpiece 1 can be machined by performing electrical discharge machining while controlling the rotating shaft 21 (A-axis) simultaneously with the X- and Y-axes (that is, controlling three axes simultaneously). Further, the workpiece 1 can be machined by simultaneously controlling the rotating shaft 21 and the X- or Y-axis motor 14 or 16.

As described above, the numerical controller for controlling the wire electrical discharge machine according to the present invention can drive at least one linear axis and a rotating shaft that rotates the workpiece 1 about the center axis parallel to the linear axis.

Reference numerals 4, 5 and 6 denote the movement direction of the wire electrode 2, the rotation of the workpiece 1 by the rotating shaft, and the rotation center axis of the workpiece 1, respectively.

The following is a description of control by the numerical controller 40 of FIG. 2 for stabilizing the electrical discharge machining by the electrical discharge machine.

The machining of the workpiece 1 by the wire electrode 2 can be stabilized by performing control such that the speed of relative movement of the wire electrode 2 and the workpiece 1 at a workpiece machining point agrees with the command speed Fc. FIG. 2 illustrates how the distance from the center of rotation of the workpiece corresponding to the workpiece machining point to the machining point varies with the progress of the machining.

Figures 3, 4:
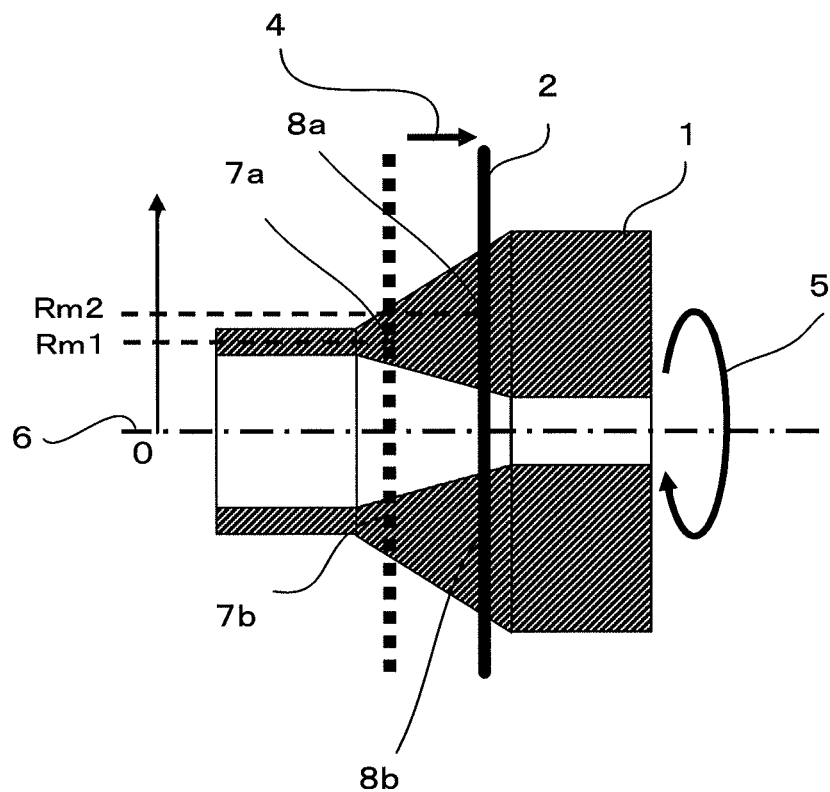
FIG. 3 is a diagram illustrating how the distance from the center of rotation of a workpiece corresponding to a workpiece machining point to the machining point varies as wire electrical discharge machining progresses.
FIG. 4 shows an example where a rotation radius at a block end point is commanded according to a machining program.

If a value of a radius Rm (hereinafter referred to as "average radius Rm" or "average rotation radius Rm") which can divide an area of a fan-shaped range, the rotation of the workpiece 1, into two sections having the same area, a section outside the radius Rm and a section inside the radius Rm, at a workpiece machining point, is ascertained, then the respective speeds of the linear axis and the rotation axis can be determined according to equation (1) given below. In FIG. 3, reference symbol Rm1 denotes the average rotation radius at workpiece machining points 7a and 7b, and Rm2 denotes the average rotation radius at workpiece machining points 8a and 8b. The average rotation radius is assumed to be larger than the sum of the inner radius and half of the difference between the outer and inner radii.

$$\text{Command speed } Fc = \sqrt{(Fx^2 + Fa^2)} \tag{1}$$

where Fx is the linear axis speed (mm/min) and Fa is Fa=rotation axis speed (deg/min)×π×Rm (mm)/180 (deg).

The average rotation radius Rm at the workpiece machining point, that is, the position on the workpiece 1 to be machined, is definite during the creation of the machining program. Therefore, it is only necessary to ascertain the outer and inner radii of the workpiece 1 for each block intended during the creation of the machining program.

In the present invention, the outer and inner radii of rotation of the workpiece at the end point of a certain block are specified for each block. If the values of the outer and inner radii of rotation at the end point of a certain block are varied from those for the immediately preceding block, the outer and inner radii of rotation are determined to be gradually changing with distance from the start point toward the end point of the block concerned. The machining is stabilized by performing control in a manner such that the speed of relative movement of the wire electrode and the workpiece at the workpiece machining point agrees with the command speed, based on the given outer and inner radii of rotation.

FIG. 4 shows an example where a move command for the linear axis and the outer and inner radii of rotation at the block end point are commanded. Reference symbols R and K denote the outer and inner radii, respectively, of rotation at the block end point. G999 is a command that designates an initial rotation radius. In this case, the outer and inner radii are specified. The following is a description of each block. In the program example shown in FIG. 4, G00X0A0. (block indicative of positioning to a machining start position X0A0) is omitted.

G999R30.K25. is a command in which the outer and inner radii R and K of the initial rotation radius are designated 30. and 25., respectively.

G01X10.A10.R30.K25. is a command in which the outer and inner radii of the rotation radius at a position X10.A10. are designated 30. and 25., respectively.

G01X20.A0.R60.K5. is a command in which the outer and inner radii of the rotation radius at a position X20.A0. are given by 60. and 5., respectively. Thus, the outer and inner radii of the rotation radius change from 30. to 60. and from 25. to 5., respectively.

G01X30.A10.R60.K5. is a command in which the outer and inner radii of the rotation radius at a position X30.A10. are given by 60. and 5., respectively.

Figure 5:
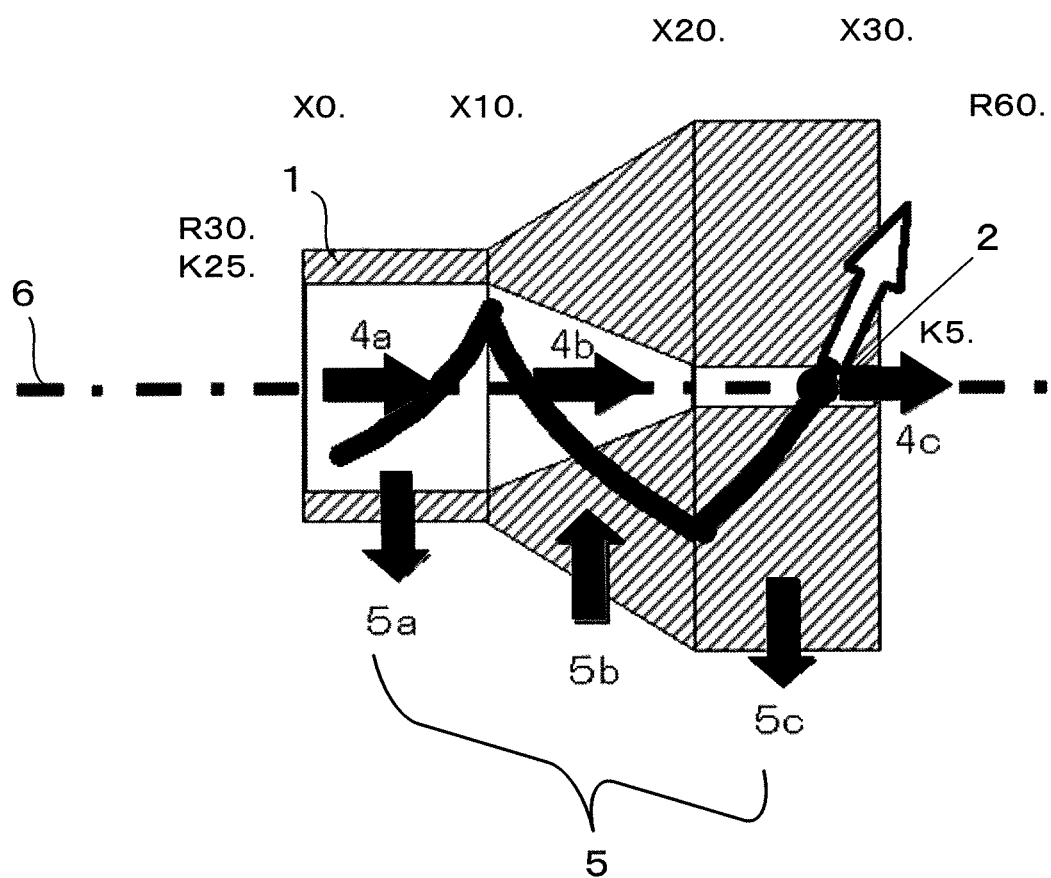
FIG. 5 illustrates the wire electrical discharge machining of the workpiece according to the machining program of FIG. 4.

FIG. 5 is a view of the workpiece 1 taken from the upper wire guide 9 toward the lower wire guide 10, and illustrates how wire electrical discharge machining of the workpiece is performed based on the execution of the machining program shown in FIGS. 4. X10., X20. and X30. shown in FIG. 5 are commanded in the respective blocks in FIG. 4. Reference symbols 4a, 4b and 4c individually indicate relative movement directions of the wire electrode 2 with respect to the workpiece 1. The wire electrode 2 moves relative to the workpiece 1 in the wire-electrode movement direction 4 (along the linear axis or X-axis). Further, the workpiece 1 rotates in workpiece rotation directions 5a, 5b and 5c (about the rotation axis or A-axis).

Figure 6A:
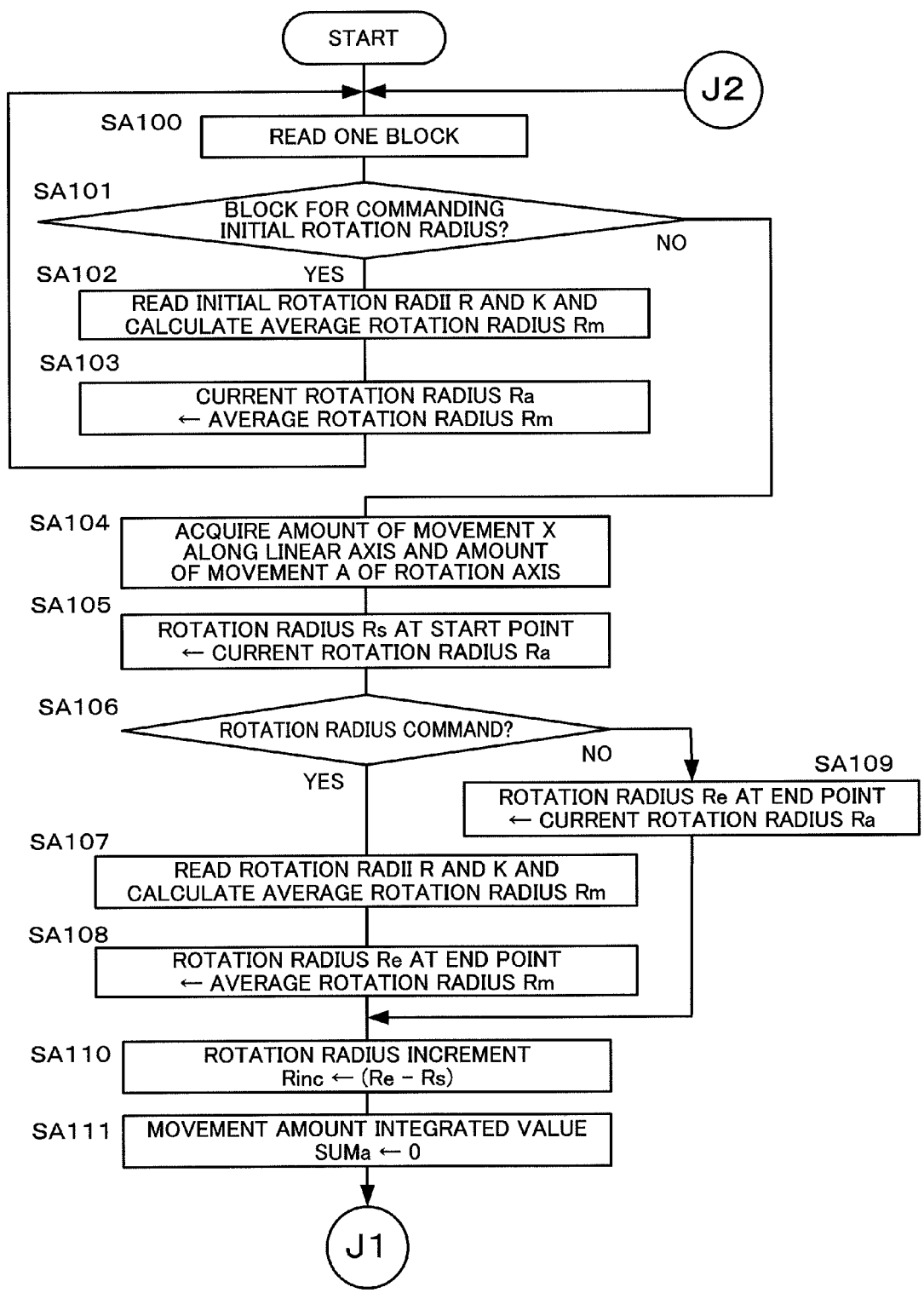
FIGS. 6A and 6B are flowcharts illustrating an algorithm of processing performed by the wire electrical discharge machine of the present invention.
Figure 6B:
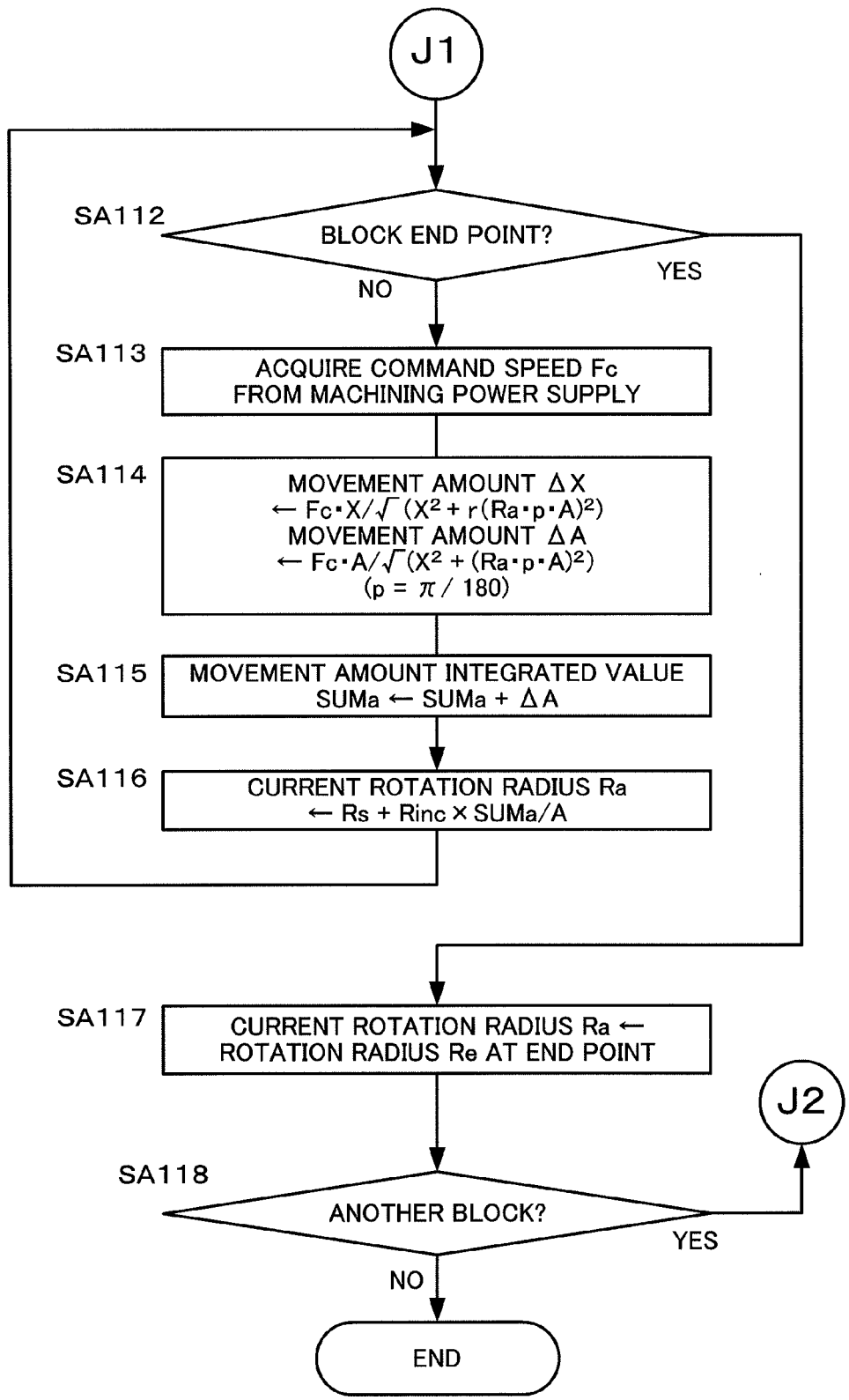

FIGS. 6A and 6B are flowcharts illustrating an algorithm of processing according to the present invention. The following is a sequential description of various steps of operation. These flowcharts illustrate processing of blocks in which a rotation radius command is included. A description of processing of simple move blocks, such as the block indicative of positioning to a machining start position, is omitted.

[Step SA100] One block of the machining program is read.

[Step SA101] It is determined whether or not the block concerned is a block for commanding the initial rotation radius. If the block concerned is the block for commanding the initial rotation radius (determination result: YES), the program proceeds to Step SA102. If not (determination result: NO), the program proceeds to Step SA104.

[Step SA102] The initial rotation radii R and K are read and the average rotation radius Rm is calculated.

[Step SA103] The average rotation radius Rm calculated in Step SA102 is substituted for a "current rotation radius Ra", whereupon the program returns to Step SA100.

[Step SA104] An amount of movement X along the linear axis and an amount of movement A about the rotation axis are acquired.

[Step SA105] The "current rotation radius Ra" stored in Step SA103 is substituted for a "rotation radius Rs at the start point".

[Step SA106] It is determined whether the rotation radius command is issued or not. If the rotation radius command is determined to be issued (determination result: YES), the program proceeds to Step SA107. If not (determination result: NO), the program proceeds to Step SA109.

[Step SA107] The command radii R and K are read and the average rotation radius Rm is calculated.

[Step SA108] The average rotation radius Rm calculated in Step SA107 is substituted for a "rotation radius Re at the end point".

[Step SA109] The "current rotation radius Ra" is substituted for the "rotation radius Re at the end point".

[Step SA110] A value obtained by subtracting the "rotation radius Rs at the start point" stored in Step SA105 from the "rotation radius Re at the end point" stored in Step SA109 is substituted for an increment Rinc of the rotation radius.

[Step SA111] A movement amount integrated value SUMa is set to an initial value or 0.

[Step SA112] It is determined whether the block end point is reached or not. If the block end point is determined to be reached (determination result: YES), the program proceeds to Step SA117. If not (determination result: NO), the program proceeds to Step SA113.

[Step SA113] The command speed Fc is acquired from the machining power supply.

[Step SA114] ΔX obtained by calculating $\Delta x = Fc \times X/\sqrt{(X^2 + (Ra \times p \times A)^2)}$ is substituted for a "movement amount ΔX", and ΔA obtained by calculating $\Delta A = Fc \times A/\sqrt{(X^2 + (Ra \times p \times A)^2)}$ is substituted for a "movement amount ΔA". Here p is given by p=π/180 (deg).

[Step SA115] The sum of the movement amount integrated value SUMa and the movement amount AA is substituted for the movement amount integrated value SUMa.

[Step SA116] The "current rotation radius Ra" is calculated according to an equation, Ra=Rs+Rinc×SUMa/A, whereupon the program returns to Step SA112.

[Step SA117] The "rotation radius Re at end point" is substituted for the "current rotation radius Ra".

[Step SA118] It is determined whether there is another block or not. If there is another block (determination result: YES), the program returns to Step SA100. If not (determination result: NO), this processing ends.

A first embodiment of the wire electrical discharge machine according to the present invention comprises an average rotation radius calculation unit, current average rotation radius calculation unit, and control unit. The average rotation radius calculation unit performs processing of Steps SA102 and SA107, in which the initial rotation radii R and K are read and the average rotation radius Rm is calculated, and the current average rotation radius calculation unit performs the processing of Step SA116, in which the "current rotation radius Ra" is calculated according to the equation, Ra=Rs+Rinc×SUMa/A, as shown in the flowcharts of FIGS. 6A and 6B. Further, the control unit performs the processing of Step SA114 in which $\Delta X=Fc\times X/\sqrt{(X^2+(Ra\times p\times A)^2)}$ and $\Delta A=Fc\times A/\sqrt{(X^2+(Ra\times p\times A)^2)}$ are calculated.

The outer and inner radii and average rotation radius obtained from each block of the machining program is temporarily stored in storage means.

There is a prior art technique in which the upper wire guide 9 is moved relative to the lower wire guide 10 and parallel to an XY-plane defined by the X- and Y-axes, by U- and V-axis motors (not shown in FIG. 2), such that the wire electrode 2 is inclined relative to the XY-plane. In the present embodiment, the wire electrode 2 can be inclined without any problem. If the wire electrode 2 is inclined, it is only necessary that the rotation radius at the workpiece machining point be specified.

Figure 7:
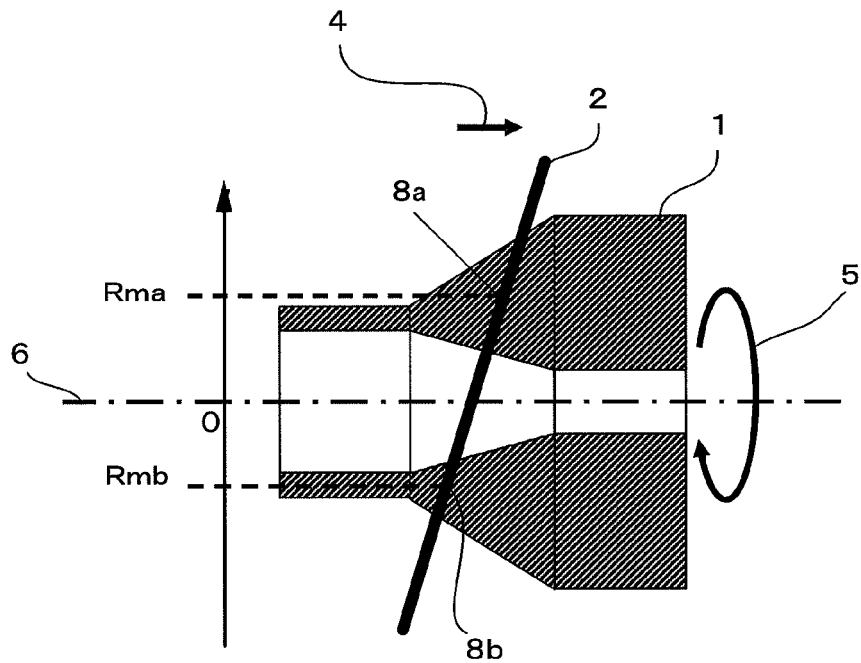
FIG. 7 is a diagram illustrating that an average rotation radius at an upper workpiece machining point and an average rotation radius at a lower workpiece machining point may be different from each other, depending on the direction of inclination of a wire electrode.

FIG. 7 is a diagram illustrating that an average rotation radius Rma at an upper workpiece machining point 8a and an average rotation radius Rmb at a lower workpiece machining point 8b may be different from each other, depending on the direction of the inclination of the wire electrode 2. In this case, the average rotation radius at that one of the upper and lower workpiece machining points 8a and 8b where machining accuracy is regarded as important may be specified. If the upper and lower workpiece machining points 8a and 8b require the same level of machining accuracy, the same level can be achieved by specifying an average of the rotation radii at the workpiece machining points 8a and 8b as the average rotation radius Rm.

Figure 8:
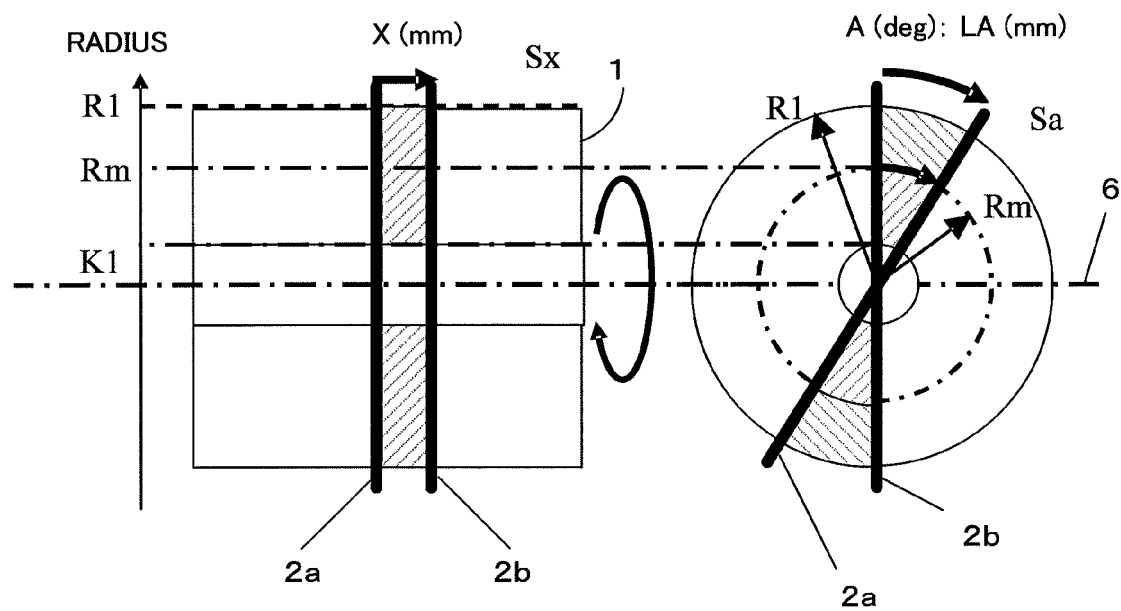
FIG. 8 is a diagram illustrating how to calculate the value of the average rotation radius.

FIG. 8 is a diagram illustrating how to calculate the value of the average rotation radius Rm. The wire electrode 2 moves relative to the workpiece 1 along the X-axis and around the rotation axis from a position 2a to a position 2b.

If control is performed such that the amount of movement X along the linear axis X (see the left-hand side of FIG. 8) is equivalent to an amount of rotational movement LA through a rotation angle A on an outer radius R1, a machining area Sx at the time of machining in the direction of X-axis is larger than a machining area Sa at the time of machining in the rotational direction. Thus, a difference is caused between the amount of machining along the linear axis X and the amount of machining around the rotation axis A.

In order to achieve stable machining, therefore, the respective speed control coefficients of the X- and A-axes should be calculated and properly controlled so that the machining area Sx at the time of machining in the direction of X-axis and the machining area Sa at the time of machining in the rotational direction are equal. To this end, the average rotation radius Rm should be determined so that the movement amount X is equal to an amount of rotational movement LRm through the rotation angle A on the average rotation radius Rm.

If the workpiece is not hollow but solid, the inner radius is K1=0, and the average rotation radius Rm is half the outer radius R1. The following is a reason for this.

If the X-direction electrode area Sx=2×X×R1 and the A-direction electrode area Sa=2×R1×R1×π×A/360 are equal, $$X=R1\times\pi\times A/360 \quad (a)$$

can be obtained according to an equation, 2×X×R1=2×R1×R1×π×A/360.

If the moving distance X is equal to the moving distance LRm on the average rotation radius Rm, on the other hand, $$X=2\times\pi\times Rm\times A/360 \quad (b)$$

can be obtained based on LRm=2×π×Rm×A/360. Thereupon, Rm=R/2 is obtained according to equations (a) and (b) given above.

If K1 is not 0 (or if the workpiece is hollow, not solid), Rm is a value higher than R/2 and lower than R. In this case, Rm should be Rm=(R1−K1)/2+K1.

Figure 9:
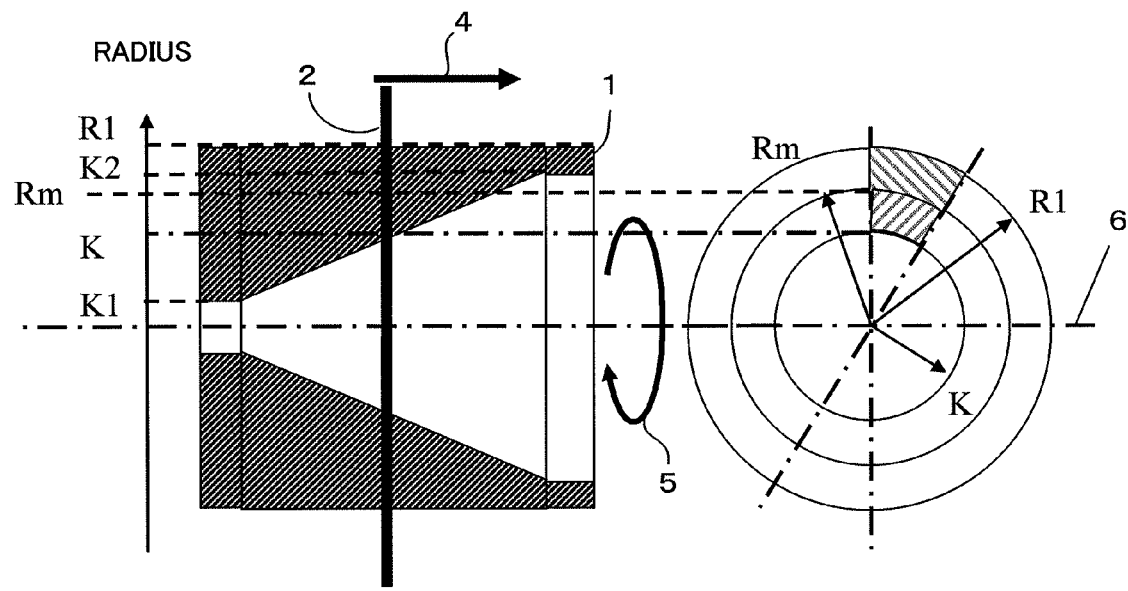
FIG. 9 is a diagram showing an example of calculation of the average rotation radius for the case where the inner radius of the workpiece varies.

FIG. 9 shows an example of calculation of the average rotation radius Rm for the case where the inner radius of the workpiece varies.

An inner radius K at the current machining position is calculated based on radii K1 and K2 at the start and end points of the inner radius, and the average rotation radius Rm is determined by the calculated inner radius K and the outer radius R1.

Even in the case where the outer radius varies, the average rotation radius Rm is calculated in the same way, based on the outer and inner radii R and K at the machining position.

Figure 10:
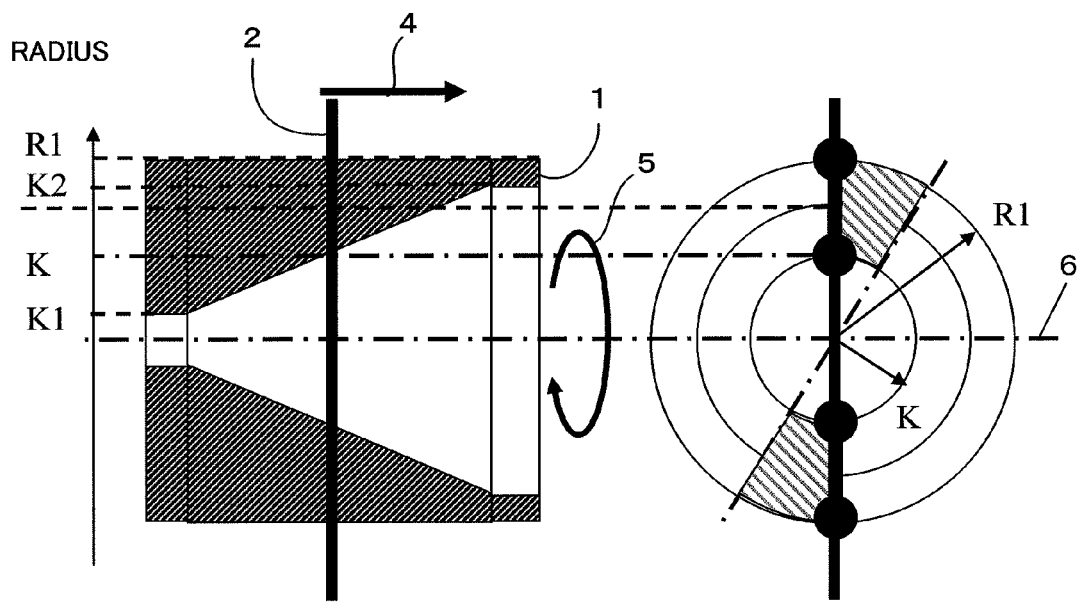
FIG. 10 shows a first example where the wall thickness of the workpiece is determined.

FIG. 10 shows a first example where the wall thickness of the workpiece is calculated based on the outer and inner workpiece radii. A second embodiment of the wire electrical discharge machine according to the present invention comprises a workpiece thickness calculation unit, current workpiece thickness calculation unit, and control unit. If the position of machining by a wire electrode 2 is located on or near a center axis of rotation, the machining thickness is twice as large as the difference between outer and inner radii R and K, and stable machining can be achieved by controlling the respective feed speeds of linear and rotation axes in accordance with this machining thickness. The workpiece thickness calculation unit calculates the workpiece thickness as twice the difference between the outer and inner radii for each block by analyzing a machining program designated for the outer and inner radii.

Figure 11:
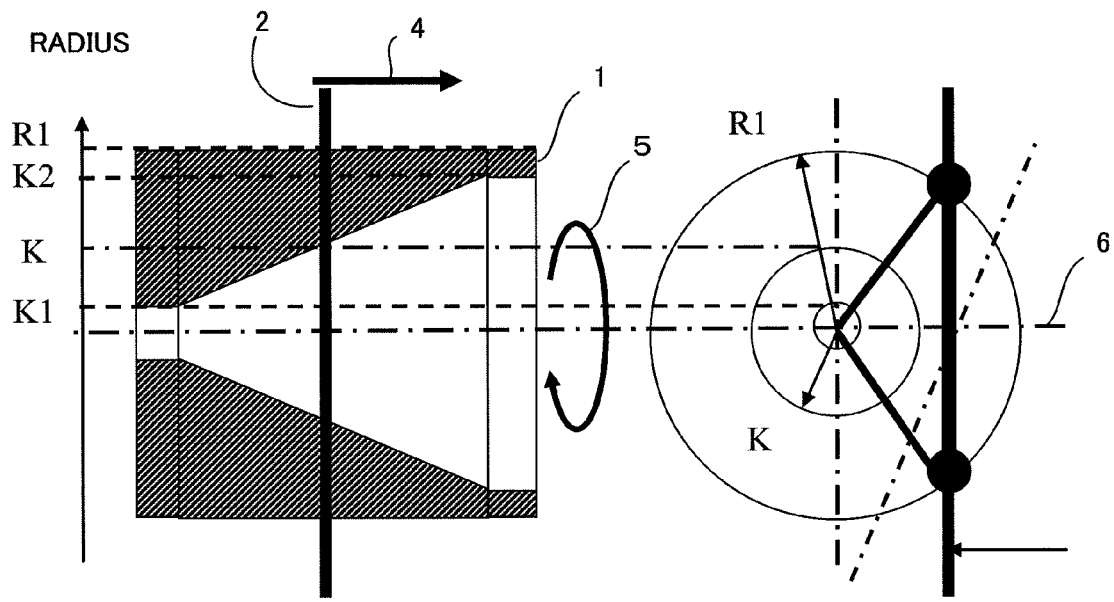
FIG. 11 shows a second example where the wall thickness of the workpiece is determined.
Figure 12:
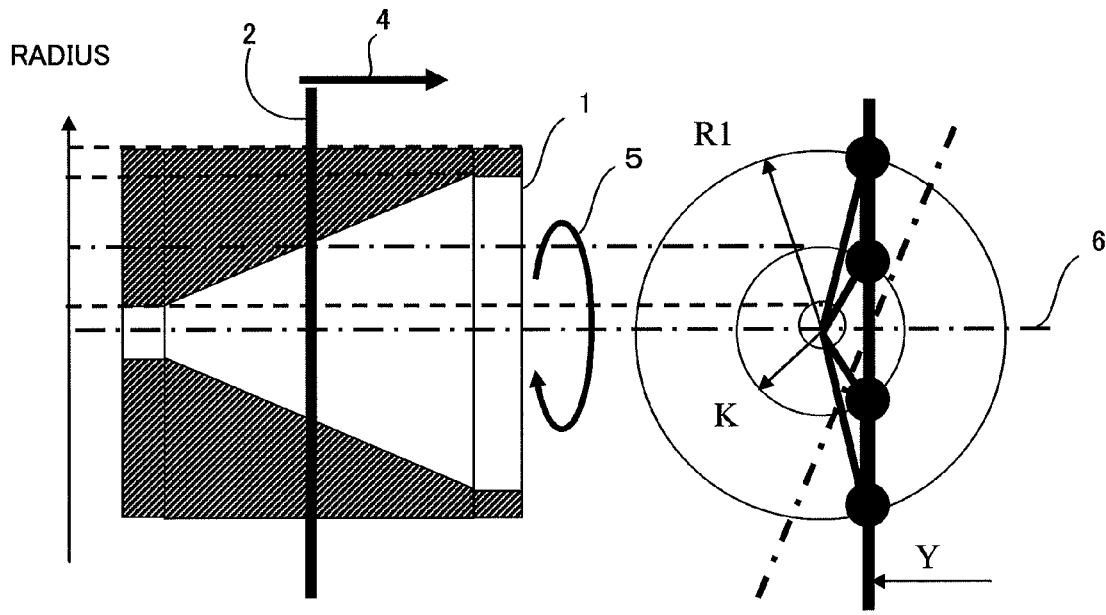
FIG. 12 shows a third example where the wall thickness of the workpiece is determined.

FIGS. 11 and 12 show second and third examples where the wall thickness of the workpiece is calculated based on the workpiece radius. In this embodiment, the wire electrical discharge machine comprises at least two linear axes.

If the position of machining by the wire electrode 2 is away from the center line of a rotation axis, the position of the center of the rotation axis is set as a coordinate origin (Y=0) in a coordinate system of axes perpendicular to the center line of the rotation axis, and then the machining thickness is calculated from the resulting coordinate value, an outer radius R1, and the inner radius K. In case of Y≥K (FIG. 11), the wall thickness is calculated by the following equation.

$$\text{Wall thickness}=2\times\sqrt{(R1\times R1-Y\times Y)}.$$

In case of Y<K (FIG. 12), the wall thickness is calculated by the following equation.

Wall thickness=$2\times\{\sqrt{(R1\times R1-Y\times Y)}-\sqrt{(K\times K-Y\times Y)}\}$.

Stable machining can be achieved by controlling the respective feed speeds of the linear and rotation axes in accordance with the calculated machining thickness. If the position of machining by the wire electrode is not located near the rotation center axis, the workpiece thickness calculation unit calculates the thickness of the workpiece at a position of machining by the values in the axial coordinate system perpendicular to the center line of the wire electrode position and analysis of the machining program in which the outer and inner radii are designated for each block.

Since an algorithm of processing in association with variation in the wall thickness of the workpiece is similar to that shown in the flowcharts of FIGS. 6A and 6B, a description thereof with reference to a flowchart is omitted here.

The wire electrical discharge machine according to the present invention described above can achieve stable machining of a workpiece that varies in wall thickness depending on the part to be machined.

Figure 13:
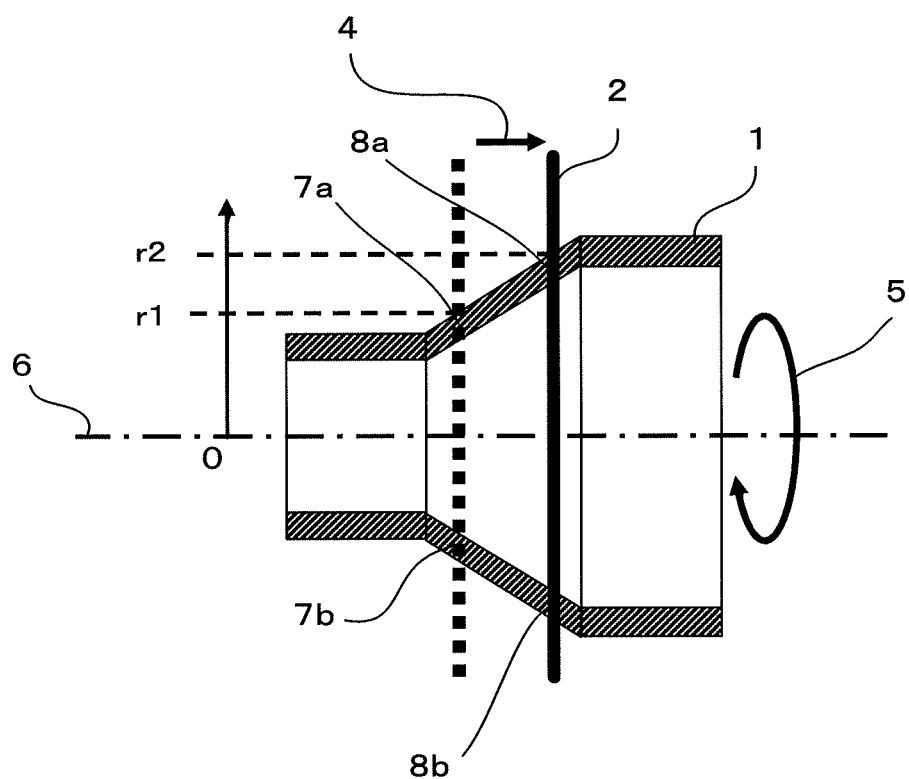
FIG. 13 is a diagram illustrating how the distance from the center of rotation of the workpiece corresponding to the workpiece machining point to the machining point varies with the progress of the machining.

A thin-walled tubular workpiece, the inner and outer radii of which are close to each other, can be machined with less error even by controlling the amount of movement along the X-axis and the angle of rotation about the A-axis according to calculation based on the outer radius. FIG. 13 is a diagram illustrating how the distance from the center of rotation of the workpiece 1 corresponding to the workpiece machining point to the machining point varies with the progress of the machining.

With the progress of the workpiece machining, the distance (rotation radius) from the center of rotation corresponding to the workpiece machining point to the machining point changes from r1 to r2, as shown in FIG. 13. There is a problem that the rotation radius varies between workpiece machining points 7a and 7b and workpiece machining points 8a and 8b for machining by the wire electrode 2, so that the speed of relative movement of the wire electrode 2 and the workpiece 1 changes, resulting in a change in the electrical discharge state and unstable machining.

The following is a description of one embodiment of the wire electrical discharge machine which comprises a rotating shaft and a controller capable of stable machining, especially for a workpiece with a uniform wall thickness and a non-constant radius of rotation, in wire electrical discharge machining in which a workpiece is rotated.

In the above embodiment of wire electrical discharge machine with the rotating shaft, the workpiece is rotated as it is moved relative to a wire electrode, which is stretched under tension between upper and lower electrode guides, in two orthogonal axial directions according to a machining program. The wire electrical discharge machine comprises a storage unit, reading unit, calculation unit, and control unit. The storage unit stores a rotation radius at a workpiece machining point at the end point of each block of the machining program. The reading unit reads a rotation radius at a workpiece machining point at the end point of a block to be executed and the rotation radius at the workpiece machining point at the end point of the directly preceding block, from the storage unit. The calculation unit calculates the rotation radius at the current workpiece machining point for each predetermined period, based on the rotation radius at the end point of the directly preceding block read from the storage unit, the rotation radius at the end point of the block to be executed, and the movement amount of the rotation axis. The control unit controls the speed of relative movement of the wire electrode and the workpiece machining point so that it agrees with a commanded speed, based on the rotation radius calculated by the calculation unit.

The rotation radius stored in the storage unit is a value commanded for each block in the machining program and obtained by analyzing the machining program. Thus, a wire electrical discharge machine with a rotating shaft can be obtained in which machining based on workpiece rotation can be stabilized especially for a workpiece with a uniform wall thickness and a non-constant radius of rotation.

Figure 14:
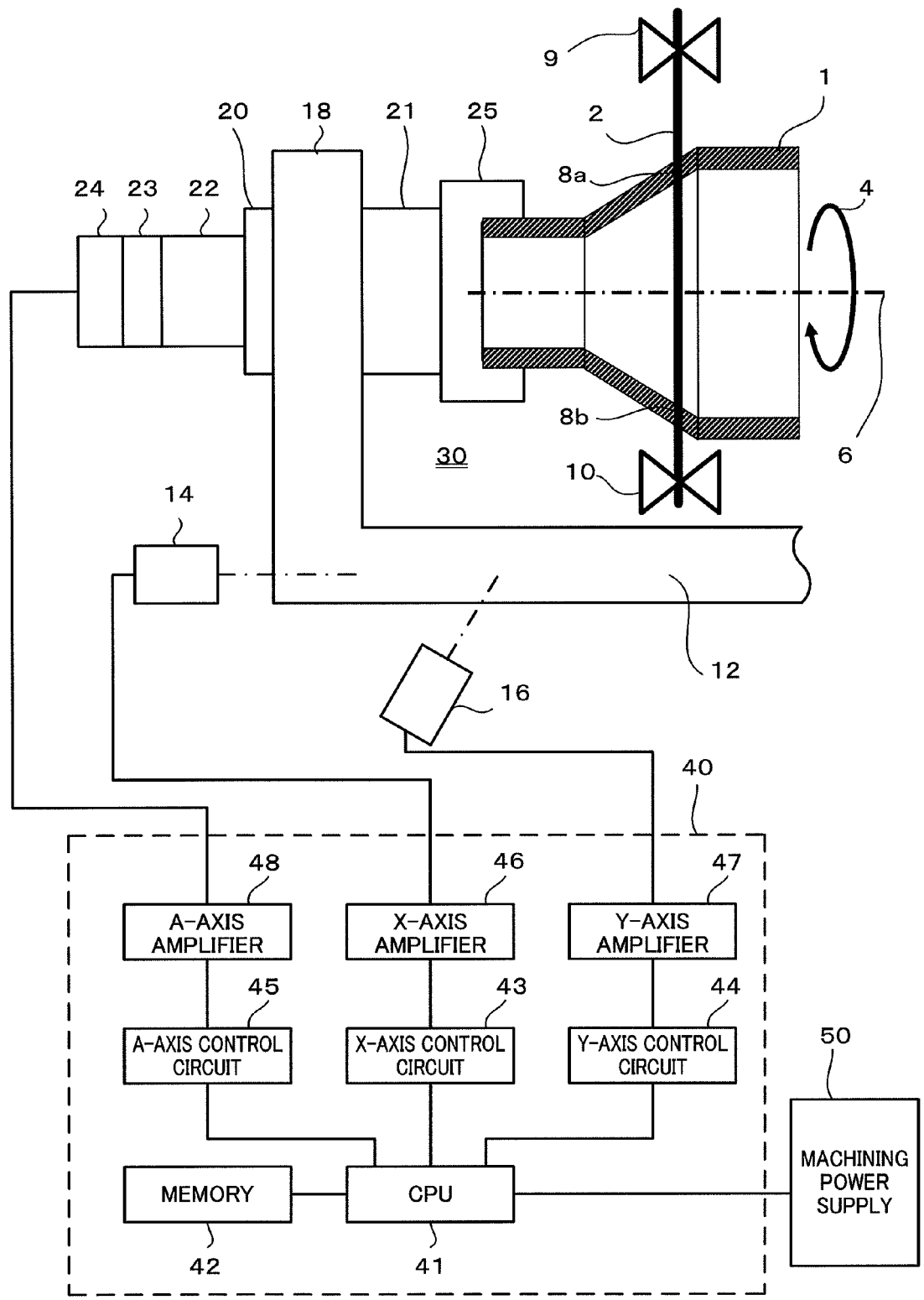
FIG. 14 is a diagram illustrating a controller of a wire electrical discharge machine configured to machine a thin-walled workpiece, the inner and outer radii of which are close to each other.

FIG. 14 is a diagram illustrating a controller of a wire electrical discharge machine configured to machine a thin-walled workpiece, the inner and outer radii of which are close to each other. A table 12 is movable in X- and Y-axis directions in a horizontal plane, guided by a guide structure (not shown). The table 12 is moved in the individual directions by an X-axis motor 14 and a Y-axis motor 16. A working tank (not shown) is fixed on the table 12, and it is filled with a working fluid 30.

A rotation drive device 20, which provides an A-axis, is secured to a support portion 18 of the table 12, the rotating shaft 21 is rotated by an A-axis motor 22, and an A-axis speed sensor 23 and an A-axis angle sensor 24 are attached to the A-axis motor 22. A workpiece fixture 25 for holding the workpiece 1 is mounted on the distal end of the rotating shaft 21.

The wire electrode 2 located opposite the workpiece 1, which is held by the workpiece fixture 25, with a machining gap therebetween, is vertically stretched under a predetermined tension applied by a driving roller and a tension roller (not shown). The wire electrode 2 is guided by the upper and lower dice-shaped wire guides 9 and 10 located up and down. A current feeder (not shown) is disposed in sliding contact with the wire electrode 2, and a pulse voltage is applied from a power supply device (not shown). This pulse voltage produces electrical discharge for machining between the wire electrode 2 and the workpiece 1.

The X- and Y-axis motors 14 and 16, which move the table 12 in the horizontal plane, and the A-axis motor 22, which rotates the workpiece 1, are connected to and drivingly controlled by the numerical controller 40. The A-axis speed sensor 23 and the A-axis angle sensor 24 are also connected to the numerical controller 40 for A-axis control. The numerical controller 40 comprises a CPU 41 as a processor for analyzing a machining program and controlling the entire wire electrical discharge machine, memory 42 for storing various data and the machining program, control circuits 43, 44 and 45 for the axes, and amplifiers 46 and 47 for the axes. These constituent elements are conventional ones.

The X- and Y-axis motors 14 and 16 for driving the table 12, axis control circuits 43 and 44 for the X- and Y-axis motors 14 and 16, and amplifiers 46 and 47 constitute planar movement means, which moves the workpiece 1 relative to the tensioned wire electrode 2 in a single plane. Further, the speed sensor 23 for controlling the A-axis motor 22, the A-axis angle sensor 24, the A-axis control circuit 45, and an A-axis amplifier 48 constitute a rotation controller. A machining power supply 50 applies a machining pulse between the workpiece 1 and the wire electrode 2. A circuit from the machining power supply 50 to the workpiece 1 and wire electrode 2 is not shown. The CPU 41 can acquire a command speed Fc from the machining power supply 50.

The workpiece 1 is held by the workpiece fixture 25 of the rotating shaft 21 and immersed in the working fluid 30 in the working tank (not shown) as it is machined. The workpiece 1 can be machined by performing electrical discharge machining while controlling the rotating shaft 21 (A-axis) simultaneously with the X- and Y-axes (three-axis control). Further, the workpiece 1 can also be machined by simultaneously controlling the rotating shaft 21 and the X- or Y-axis motor 14 or 16.

The following is a description of control for stabilizing the machining according to the present embodiment.

The machining of the workpiece 1 by the wire electrode 2 can be stabilized by performing control such that the speed of relative movement of the wire electrode 2 and the workpiece 1 at a workpiece machining point agrees with the command speed Fc. If a rotation radius r at the workpiece machining point is ascertained, the respective speeds of the linear and rotation axes can be determined according to equation (2) given below.

$$\text{Command speed } Fc=\sqrt{(Fx^2+Fa^2)} \qquad (2)$$

where Fx is the linear axis speed (mm/min) and Fa is Fa=rotation axis speed (deg/min)×π×r (mm)/180 (deg).

The rotation radius at the workpiece machining point, that is, the position on the workpiece 1 to be machined, is definite during the creation of the machining program. Therefore, it is only necessary to ascertain the rotation radius of the workpiece 1 for each block intended during the creation of the machining program.

In this embodiment, the rotation radius at the end point of a block is specified for each block. If the value of the rotation radius at the end point of a certain block is varied from that at the end point of the directly preceding block, the rotation radius is determined to be gradually changing with distance from the start point toward the end point of the block concerned. The machining is stabilized by performing control such that the speed of relative movement of the wire electrode and the workpiece at the workpiece machining point agrees with the commanded speed, based on the given rotation radius.

FIG. 15 shows an example where the rotation radius at the block end point is commanded. Reference symbol R denotes the rotation radius at the block end point. G999 is a command that designates an initial rotation radius. In this example, G00X0Y0. (block indicative of positioning to a machining start position X0Y0) is omitted.

G999R30. is a command in which an initial rotation radius is designated 30.

G01X10.A10.R30. is a command in which the rotation radius at a position X10.A10. is designated 30.

G01X20.A0.R35. is a command in which the rotation radius at a position X20.A0. is designated 35. Thus, the rotation radius changes from 30. to 35.

G01X30.A10.R35. is a command in which the rotation radius at a position X30.A10. is designated 35.

FIG. 16 illustrates machining of the workpiece according to the machining program shown in FIG. 15. X10., X20. and X30. shown in FIG. 16 are designated by the blocks in FIG. 15. The wire electrode 2 relatively moves in a wire-electrode movement direction 4 (along the linear axis or X-axis). Further, the workpiece 1 rotates in workpiece rotation directions 5a, 5b and 5c (about the rotation axis or A-axis).

There is a prior art technique in which the upper wire guide 9 is moved relative to the lower wire guide 10 and parallel to an XY-plane by U- and V-axis motors (not shown in FIG. 14) such that the wire electrode 2 is inclined. In the present embodiment, the wire electrode 2 can be inclined without any problem. If the wire electrode 2 is inclined, it is only necessary that the rotation radius at the workpiece machining point be specified.

FIG. 17 is a diagram illustrating that a rotation radius Ra at an upper workpiece machining point 8a and a rotation radius Rb at a lower workpiece machining point 8b may be different from each other, depending on the direction of the inclination of the wire electrode 2. In this case, the rotation radius at that one of the upper and lower workpiece machining points where machining accuracy is regarded as important may be specified. If the upper and lower workpiece machining points require the same level of machining accuracy, the same level can be achieved by specifying an average of the rotation radii at the workpiece machining points as an average rotation radius.

Figure 18A:
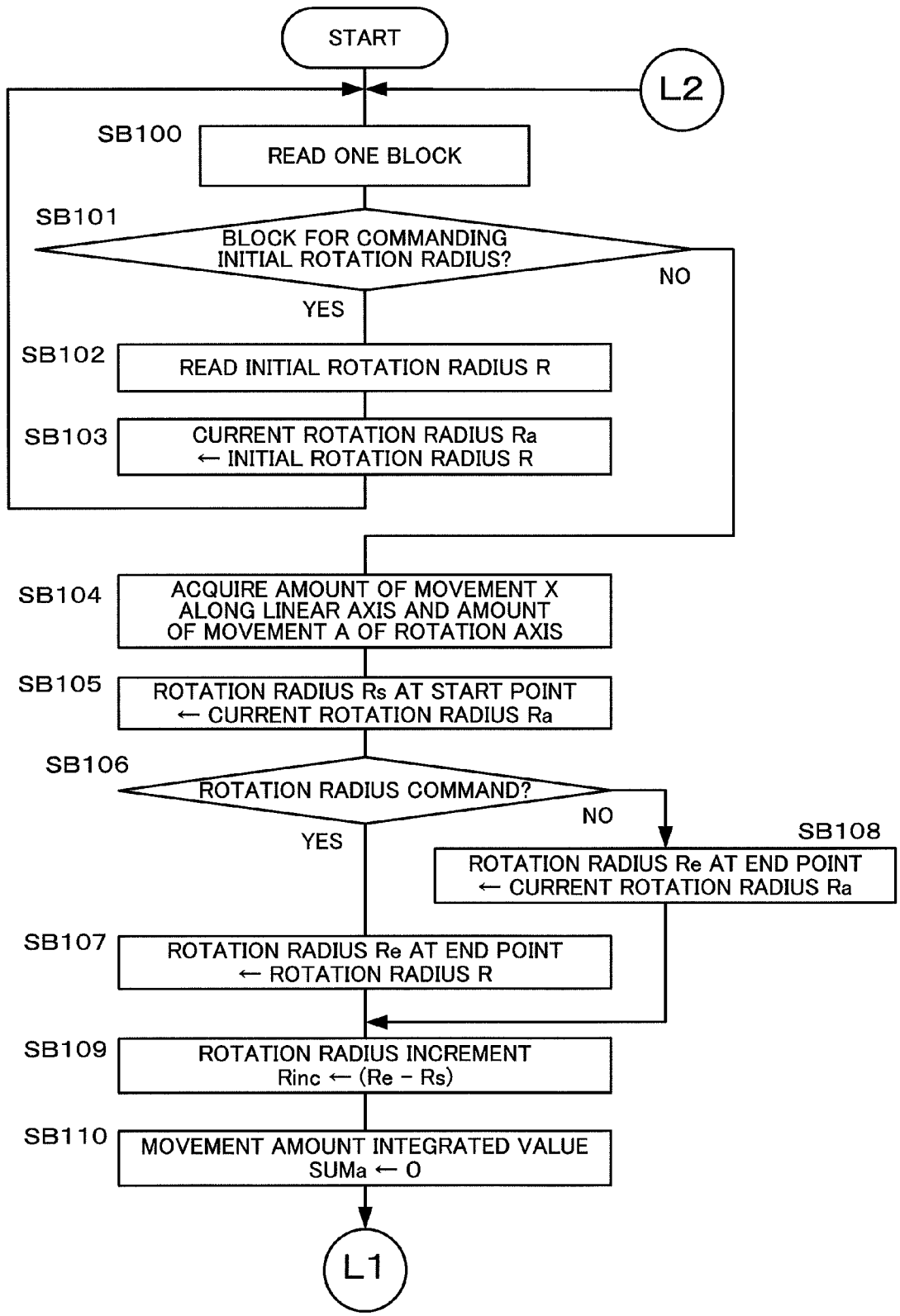
FIGS. 18A and 18B are flowcharts illustrating processing for machining a thin-walled workpiece, the inner and outer radii of which are close to each other, by means of the wire electrical discharge machine according to the present invention.
Figure 18B:
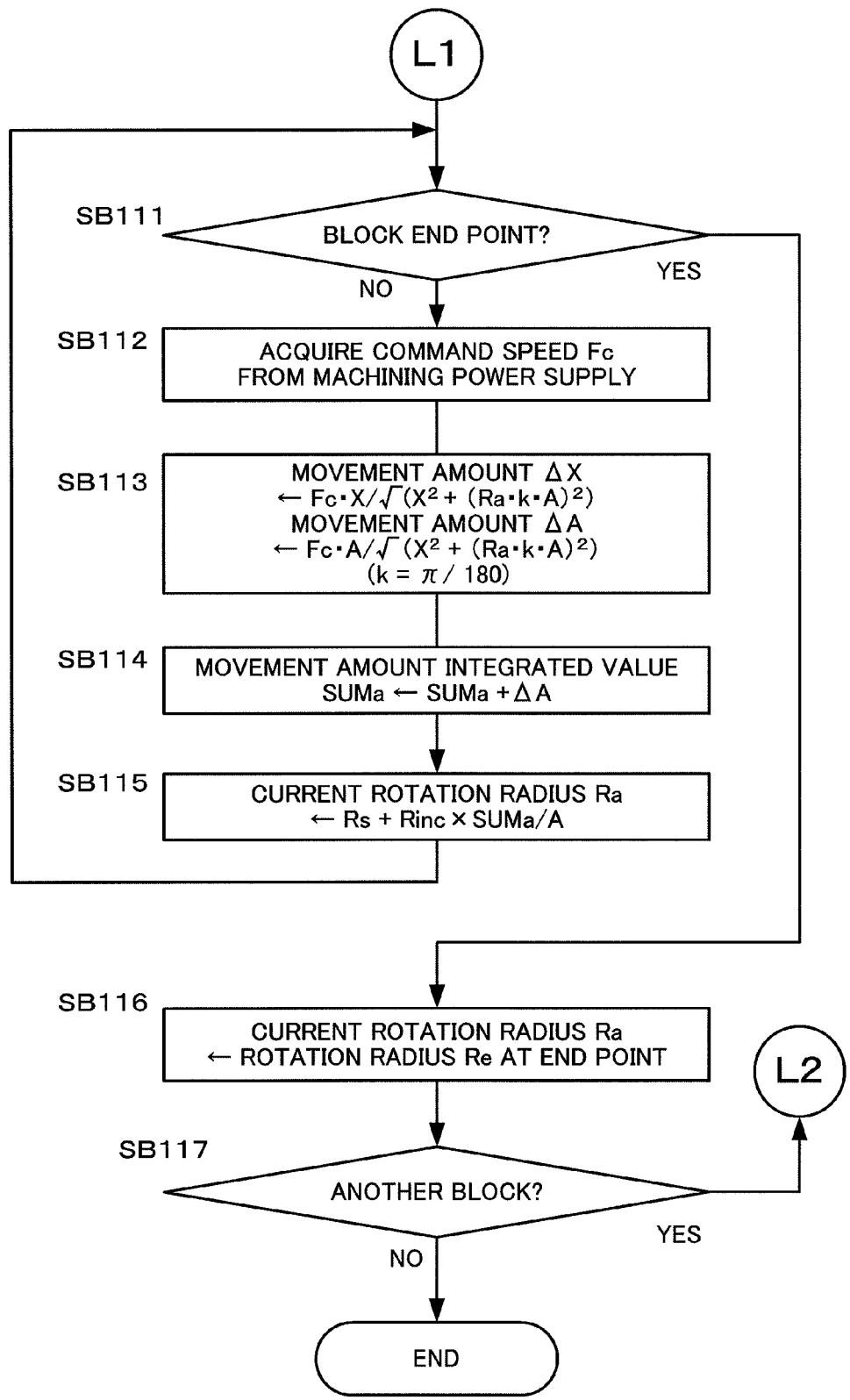
Figure 19:
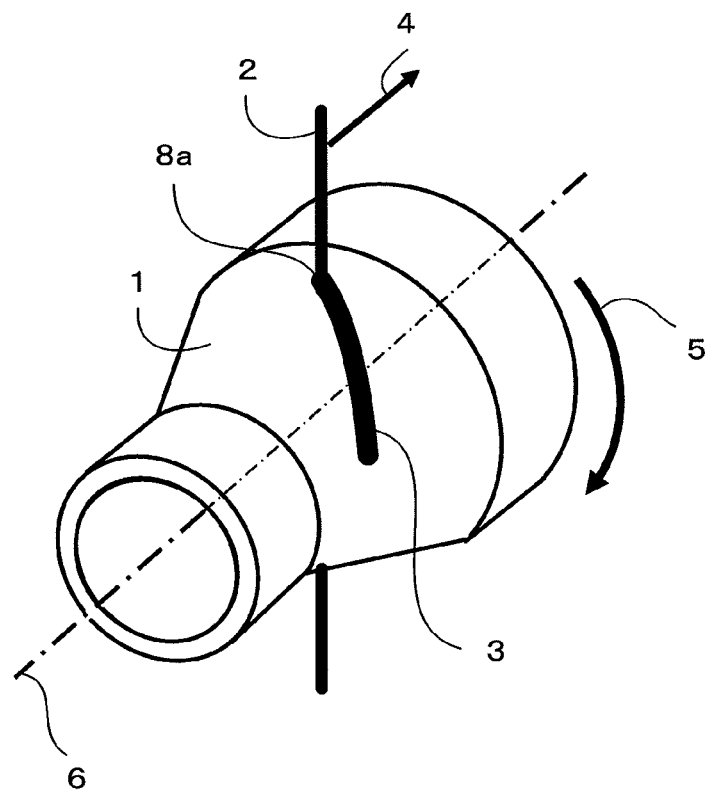
FIG. 19 is a diagram illustrating how a workpiece is rotated as a wire electrode is moved for desired machining by a wire electrical discharge machine.
Figure 20:
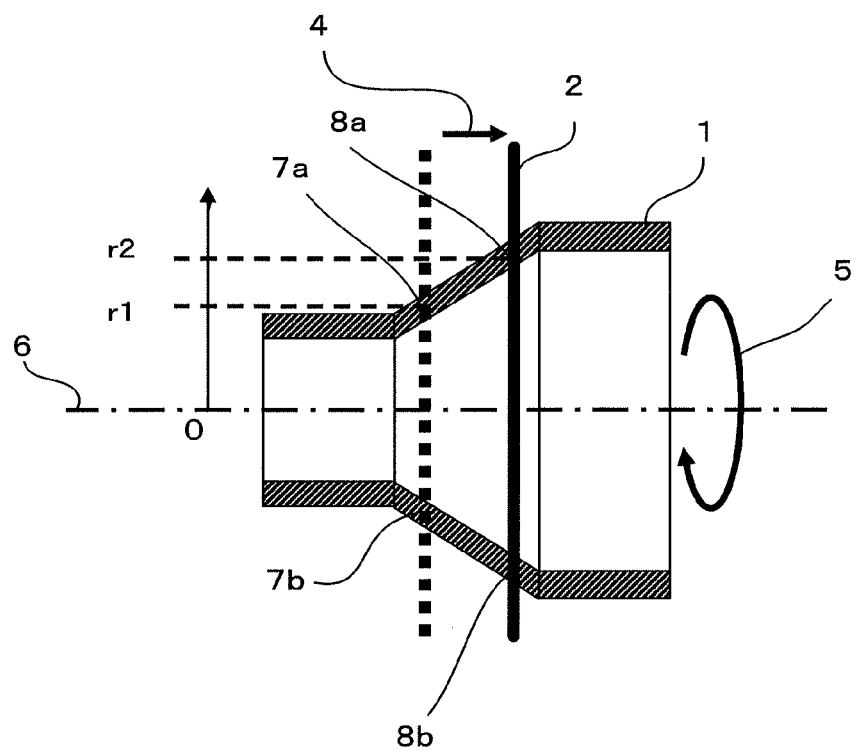
FIG. 20 is a diagram illustrating how the distance (rotation radius) from the center of rotation of the workpiece corresponding to a workpiece machining point to the machining point varies as machining of the workpiece progresses.
Figure 21:
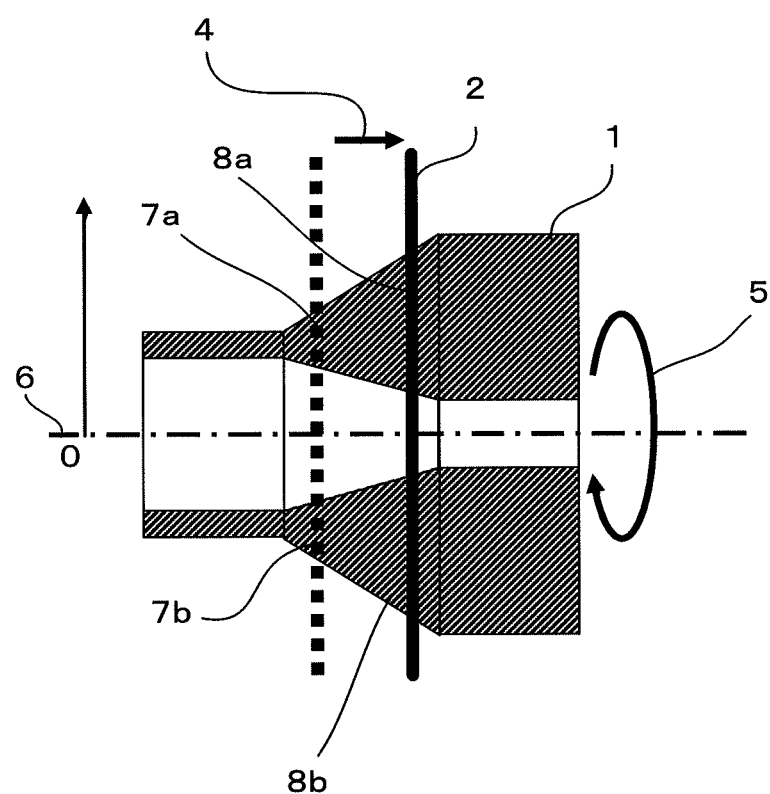
FIG. 21 is a diagram illustrating how the distance (rotation radius) from the center of rotation corresponding to a workpiece machining point to the machining point varies as machining progresses.

FIGS. 18A and 18B are flowcharts illustrating processing for machining a thin-walled workpiece, the inner and outer radii of which are close to each other, by means of the wire electrical discharge machine according to the present invention. These flowcharts illustrate processing of blocks in which a rotation radius command is included. A description of processing of simple move blocks, such as the block indicative of positioning to a machining start position, is omitted.

[Step SB100] One block of the machining program is read.

[Step SB101] It is determined whether or not the block concerned is a block for commanding the initial rotation radius. If the block concerned is the block for commanding the initial rotation radius (determination result: YES), the program proceeds to Step SB102. If not (determination result: NO), the program proceeds to Step SB104.

[Step SB102] The initial rotation radius R is read.

[Step SB103] The initial rotation radius R calculated in Step SB102 is substituted for a "current rotation radius Ra", whereupon the program returns to Step SB100.

[Step SB104] An amount of movement X along the linear axis and an amount of movement A about the rotation axis are acquired. These amounts of movement are designated by the blocks of the machining program.

[Step SB105] The "current rotation radius Ra" stored in Step SB103 is substituted for a "rotation radius Rs at the start point".

[Step SB106] It is determined whether the rotation radius command is issued or not. If the rotation radius command is determined to be issued (determination result: YES), the program proceeds to Step SB107. If not (determination result: NO), the program proceeds to Step SB108.

[Step SB107] The rotation radius R is substituted for a "rotation radius Re at the end point".

[Step SB108] The "current rotation radius Ra" is substituted for the "rotation radius Re at the end point".

[Step SB109] A value obtained by subtracting the "rotation radius Rs at the start point" stored in Step SB105 from the "rotation radius Re at the end point" stored in Step SB108 is substituted for an increment Rinc of the rotation radius.

[Step SB110] A movement amount integrated value SUMa is set to an initial value or 0.

[Step SB111] It is determined whether the block end point is reached or not. If the block end point is determined to be reached (determination result: YES), the program proceeds to Step SB116. If not (determination result: NO), the program proceeds to Step SB112.

[Step SB112] The command speed Fc is acquired from the machining power supply.

[Step SB113] ΔX obtained by calculating $\Delta X = Fc \times X / \sqrt{(X^2+(Ra \times p \times A)^2)}$ is substituted for a "movement amount ΔX", and ΔA obtained by calculating $\Delta A = Fc \times A/\sqrt{(X^2+(Ra \times p \times A)^2)}$ is substituted for a "movement amount ΔA". Here p is given by p=π/180 (deg).

[Step SB114] The sum of the movement amount integrated value SUMa and the movement amount ΔA is substituted for the movement amount integrated value SUMa.

[Step SB115] The "current rotation radius Ra" is calculated according to an equation, Rs+Rinc×SUMa/A, whereupon the program returns to Step SB111.

[Step SB116] The "rotation radius Re at end point" is substituted for the "current rotation radius Ra".

[Step SB117] It is determined whether there is another block or not. If there is another block (determination result: YES), the program returns to Step SB100. If not (determination result: NO), this processing ends.

The invention claimed is:

1. A wire electrical discharge machine, comprising:
a machining power supply;
a wire electrode, which is stretched under tension between an upper wire guide and a lower wire guide;
at least one linear axis and a rotation axis extending parallel to the linear axis, for moving a workpiece relative to the wire electrode along the linear axis and for rotating the workpiece about the rotation axis, according to a machining program, whereby the workpiece is machined;
an average rotation radius calculation unit configured to calculate an average rotation radius based on an outer radius and an inner radius of the workpiece designated in each block of the machining program;
a current average rotation radius calculation unit configured to calculate a current average rotation radius at a current workpiece machining point for each predetermined period, based on
average rotation radii at respective end points of a block to be executed and a directly preceding block, which are calculated by the average rotation radius calculation unit, and
an amount of movement of the rotation axis; and
a control unit configured to perform control such that the speed of relative movement of the wire electrode and the workpiece at the current workpiece machining point agrees with a command speed acquired from the machining power supply, based on the current average rotation radius calculated by the current rotation radius calculation unit.

2. The wire electrical discharge machine according to claim 1, wherein the average rotation radius is a value obtained by analyzing the machining program in which the outer and inner radii of the workpiece are designated for each block.

3. The wire electrical discharge machine according to claim 2, wherein the average rotation radius calculation unit is configured to calculate the average rotation radius as a value
higher than the sum of (i) the inner radius and (ii) half of a value obtained by subtracting the inner radius from the outer radius, and
lower than the outer radius.

4. A wire electrical discharge machine, comprising:
a machining power supply;
a wire electrode, which is stretched under tension between an upper wire electrode guide and a lower wire electrode guide;
at least one linear axis and a rotation axis, for moving a workpiece relative to the wire electrode along the linear axis and for rotating the workpiece about the rotation axis, according to a machining program, whereby the workpiece is machined:
a workpiece thickness calculation unit configured to calculate a thickness of the workpiece based on an outer radius and an inner radius of the workpiece designated in each block of the machining program;
a current workpiece thickness calculation unit configured to calculate a current workpiece thickness at a current workpiece machining point for each predetermined period, based on
thicknesses at respective end points of a block to be executed and a directly preceding block, which are calculated by the workpiece thickness calculation unit, and
an amount of movement of the rotation axis; and
a control unit configured to perform control such that the speed of relative movement of the wire electrode and the workpiece at the current workpiece machining point agrees with a command speed acquired from the machining power supply, based on the current workpiece thickness calculated by the current workpiece thickness calculation unit.

5. The wire electrical discharge machine according to claim 4, wherein the workpiece thickness calculation unit is configured to calculate the thickness of the workpiece as twice the difference between the outer and inner radii of the workpiece for each block, by analyzing the machining program in which the outer and inner radii of the workpiece are designated for each block.

6. The wire electrical discharge machine according to claim 4, wherein
said at least one linear axis comprises two linear axes, and
in case where a position of machining by the wire electrode is not located near a rotation center axis of the work piece, the workpiece thickness calculation unit is configured to calculate the thickness of the workpiece at the position of machining by
the values in the axial coordinate system perpendicular to the center line of the wire electrode position, and
analysis of the machining program in which the outer and inner radii of the workpiece are designated for each block.

7. A wire electrical discharge machine, comprising:
a machining power supply;
a wire electrode, which is stretched under tension between an upper wire electrode guide and a lower wire electrode guide;
at least one linear axis and a rotation axis, for moving a workpiece relative to the wire electrode along the linear axis and for rotating the workpiece about the rotation axis, according to a machining program, whereby the workpiece is machined;
a calculation unit configured to calculate a rotation radius at a current workpiece machining point for each predetermined period, based on
rotation radii of the workpiece at respective end points of a block to be executed and a directly preceding block, and
an amount of movement about the rotation axis; and
a control unit configured to perform control such that the speed of relative movement of the wire electrode and the workpiece at the current workpiece machining point agrees with a command speed acquired from the machining power supply, based on the rotation radius calculated by the calculation unit.

8. The wire electrical discharge machine according to claim 7, wherein the rotation radius is a value designated for each block in the machining program and obtained by analyzing the machining program.

* * * * *